United States Patent
Benner, Jr.

(10) Patent No.: US 11,728,698 B2
(45) Date of Patent: Aug. 15, 2023

(54) VARIABLE TORQUE LOW INERTIA BRUSHLESS MOTOR

(71) Applicant: William R. Benner, Jr., Sorrento, FL (US)

(72) Inventor: William R. Benner, Jr., Sorrento, FL (US)

( * ) Notice: Subject to any disclaimer, the term of this patent is extended or adjusted under 35 U.S.C. 154(b) by 0 days.

(21) Appl. No.: 16/693,883

(22) Filed: Nov. 25, 2019

(65) Prior Publication Data

US 2020/0091784 A1 Mar. 19, 2020

Related U.S. Application Data

(63) Continuation-in-part of application No. PCT/US2018/044614, filed on Jul. 31, 2018.

(60) Provisional application No. 62/539,247, filed on Jul. 31, 2017.

(51) Int. Cl.
| | |
|---|---|
| *H02K 1/16* | (2006.01) |
| *H02K 3/34* | (2006.01) |
| *H02K 3/16* | (2006.01) |
| *H02K 29/03* | (2006.01) |

(52) U.S. Cl.
CPC ............... *H02K 1/165* (2013.01); *H02K 3/16* (2013.01); *H02K 3/345* (2013.01); *H02K 29/03* (2013.01)

(58) Field of Classification Search
CPC .. H02K 1/16; H02K 3/16; H02K 3/34; H02K 21/16; H02K 1/165; H02K 3/345; H02K 21/14; H02K 29/03
See application file for complete search history.

(56) References Cited

U.S. PATENT DOCUMENTS

| | | | | |
|---|---|---|---|---|
| 2,778,964 | A * | 1/1957 | Balke | H02K 3/345 |
| | | | | 310/214 |
| 2,802,123 | A * | 8/1957 | Tweedy | H02K 17/08 |
| | | | | 310/198 |
| 4,038,575 | A * | 7/1977 | Nordebo | H02K 19/24 |
| | | | | 310/179 |
| 4,163,166 | A * | 7/1979 | Kamiya | H02K 3/48 |
| | | | | 310/214 |
| 5,045,742 | A | 9/1991 | Armstrong et al. | |
| 6,787,958 | B1 * | 9/2004 | Walter | H02K 1/246 |
| | | | | 310/162 |
| 8,040,007 | B2 * | 10/2011 | Petrov | H02K 15/12 |
| | | | | 310/156.27 |

(Continued)

FOREIGN PATENT DOCUMENTS

| | | | | |
|---|---|---|---|---|
| WO | WO-2012052618 A2 * | 4/2012 | ........... | H02K 15/065 |
| WO | 2016102353 A1 | 6/2016 | | |
| WO | WO-2016192345 A1 * | 12/2016 | ............. | H02K 17/08 |

OTHER PUBLICATIONS

International Search Report dated Oct. 17, 2018 for PCT/US18/44614.

*Primary Examiner* — Naishadh N Desai
(74) *Attorney, Agent, or Firm* — Greenberg Traurig, LLP

(57) ABSTRACT

Embodiments of a small brushless motor include a two-pole rotor and a stator having four slots into which electrical coils are placed. Additional embodiments of a small brushless motor include a two-pole rotor and stator having eight slots into which four, six, or eight electrical coils are placed. The stator may include a means for limiting cogging. The small brushless motor having a high torque constant, low coil resistance, low coil inductance, and high thermal conductivity is provided.

37 Claims, 33 Drawing Sheets

(56) References Cited

U.S. PATENT DOCUMENTS

| | | | |
|---|---|---|---|
| 10,284,038 B1* | 5/2019 | Benner, Jr. | H02K 1/143 |
| 10,476,348 B2* | 11/2019 | Mankame | H02K 1/17 |
| 10,720,824 B2* | 7/2020 | Benner, Jr. | H02K 33/16 |
| 2008/0036328 A1* | 2/2008 | Hoffmann | H02K 1/146 |
| | | | 310/156.81 |
| 2009/0174280 A1* | 7/2009 | Prudham | H02K 29/03 |
| | | | 310/216.022 |
| 2013/0076185 A1* | 3/2013 | Benner, Jr. | H02K 1/148 |
| | | | 310/156.01 |
| 2013/0076195 A1* | 3/2013 | Li | H02K 1/16 |
| | | | 310/216.097 |
| 2013/0181549 A1* | 7/2013 | Benner, Jr. | H02K 21/046 |
| | | | 310/38 |
| 2014/0209729 A1* | 7/2014 | Benner, Jr. | H01F 41/071 |
| | | | 242/432 |
| 2015/0311762 A1* | 10/2015 | Chai | H02K 3/325 |
| | | | 310/215 |
| 2016/0233753 A1* | 8/2016 | Benner, Jr. | G02B 26/10 |
| 2017/0222526 A1* | 8/2017 | Li | H02K 21/14 |
| 2019/0296595 A1* | 9/2019 | Benner, Jr. | H02K 1/146 |
| 2020/0091784 A1* | 3/2020 | Benner, Jr. | H02K 21/16 |

* cited by examiner

VARIABLE TORQUE LOW INERTIA BRUSHLESS MOTOR

CROSS REFERENCE TO RELATED APPLICATIONS

This application is a continuation-in-part of, and claims the benefit of, and priority to, PCT Application Serial No. PCT/US18/44614, filed Jul. 31, 2018, which itself claims the benefit of, and priority to, U.S. Provisional Patent Application Ser. No. 62/539,247, entitled "High Torque Low Inertia Brushless Motor," filed Jul. 31, 2017, the entirety of which is incorporated by reference and commonly owned.

FIELD OF THE INVENTION

The present invention relates generally to low inertia, continuous rotation motors that offer high rotational speed and high acceleration. Such motors may be particularly useful in the field of optical scanning.

BACKGROUND

Brushless motors have been in existence for decades and are used in a variety of industrial and consumer applications. To increase their utility, brushless motors may be coupled to position encoders and servo drivers. This combination offers the ability for the motor to rotate continuously in either direction for some period of time, and also stop rotating and be positioned very precisely when desired, based on the feedback of the position encoder.

When a brushless motor is coupled to a position encoder and servo driver, it has capabilities similar to those of galvanometer-based optical scanners. Galvanometer-based optical scanners are small, high-performance motors that are typically used with a position sensor and servo driver. Galvanometer-based optical scanners can position optical elements that are typically small in size (such as mirrors, filters, prisms, etc.) very quickly and with high repeatability. Galvanometer-based scanners, however, lack the ability to rotate over an angle greater than about 40 degrees.

Despite the similarity of these two products, brushless motors have not found widespread use in optical scanning applications that involve rapid and precise back-and-forth positioning of small optical elements. This is because brushless motors in the current state of the art typically lack the high acceleration demanded by these optical scanning applications. Because of this, despite their limited-angle drawbacks, galvanometer-based optical scanners have been the primary tool of choice for such applications.

An example of a small Brushless DC-Servomotor of Series 0824006B is that manufactured by Faulhaber® and offered by the company MicroMo. According to the publicly-available datasheet for this motor, the outside diameter is 8 mm (0.315 inches), body length is 24.1 mm (0.949 inches), the rotor inertia is 0.0285 GM*CM$^2$ and angular acceleration is 1,561,000 radians/second$^2$. While 1,561,000 radians/second$^2$ is among the highest angular acceleration rates currently achieved in the art for brushless motors, it is still much lower than the angular acceleration of available galvanometer-based optical scanners having almost the same rotor inertia.

An example of a well-known galvanometer-based optical scanner is the Cambridge Technology Model 6215. According to the publicly-available datasheet for this galvanometer, the motor outside diameter is 9.5 mm (0.375 inches), and the body length is 52 mm (2.04 inches). The rotor inertia is 0.028 GM*CM$^2$, which is almost identical to that of the Faulhaber® motor presented above. However, when a modest current of 8 amps is applied to the coil, the angular acceleration is 10,800,000 radians/second$^2$, which is nearly 7 times the angular acceleration of the Brushless DC-Servomotor presented above. Higher currents are actually possible with this galvanometer-based optical scanner, which would provide even higher rates of angular acceleration.

In addition to the high acceleration capability, galvanometer-based optical scanners also offer the ability to operate with relatively high continuous currents. This is required when fast positioning and high speed motions are repeated over multiple duty cycles.

Again, as a point of comparison, and according to the datasheet for the Faulhaber® 0824006B, the rated current for continuous operation (thermal limit) is 0.66 amps and the coil resistance is 2.91 ohms. According to the datasheet for the Cambridge Technology Model 6215, the similar specification (RMS Current) is more than six times as high—4.1 amps, while the coil resistance of 2.53 ohms is similar to the Faulhaber® motor.

Brushless motors generally take on one of three topologies: slotless, toothed, or slotted. For the very small inertias typically involved in optical scanning, and also for small-diameter brushless motors as well, the slotless approach is used almost exclusively in galvanometer scanners. This involves the use of a small-diameter rotor magnet, several coils located at a small radial distance away from the rotor magnet, and a steel "shell" on the outside. This shell may be a single cylindrical piece of steel or it may be laminated. An example of this motor construction is depicted in FIG. 1. The Faulhaber® motor described above is an example of a slotless motor. Although the construction depicted in FIG. 1 uses only two coils and the Faulhaber® motor uses three coils, the principles of operation are the same.

A toothed motor is one that has salient teeth formed within the steel outer shell (stator), pointing inward toward the rotor magnet. There are also toothed motor topologies in which the teeth point outward toward rotor magnets or other stator components. In a toothed motor, coils are wound around each tooth. This may also be called a "concentrated winding". An example of this motor construction is depicted in FIG. 2. A slotted motor is similar to a toothed motor in that there are a number of slots cut into the steel outer shell (stator), with the slots pointing inward toward the rotor magnet. In a slotted motor, coil wires are placed within the slots. An example of this type of motor construction is depicted in FIG. 3.

As implied above, the ability to operate continuously is important in the field of optical scanning, where positioning of optical elements must occur rapidly and with a high duty cycle. Therefore, in the field of optical scanning, the slotless approach has several undesirable limitations that cannot be overcome. This is because, in order to improve continuous operation, the coil resistance must be reduced while the same torque is generated. This requires an increase in the area allocated to the coils. Since the coils reside in the space between the magnet and steel outer shell (which is actually the magnetic air gap), it means that this space must be increased. Unfortunately, increasing this space increases the air gap, which decreases flux density, which decreases torque production. Any gains that occurred due to an increase of the copper area are inevitably offset by losses of flux density, which is why slotless motors have this inherent limitation.

With both toothed and slotted motors, it might be possible to increase the area allocated to the coils (within practical limits) and do so without decreasing flux density. However, the inventor of the embodiments disclosed herein is not aware of any brushless motors having inertia similar to typical galvanometer-based optical scanners that are made with anything other than the slotless topology. This may be because of the difficulty in placing the coil wires onto a stator with such a small interior diameter. Indeed, for motors having a rotor inertia of 0.028 GM*CM$^2$, the rotor magnet diameter is less than 0.125 inches (less than 3.2 mm).

As noted above, galvanometer-based optical scanners offer the ability to quickly position optical elements with high precision, but the drawback of these devices is that they can only be used over a limited range of rotation angles. A typical galvanometer-based optical scanner, for example, has a maximum rotation angle of only 40 degrees.

Clearly brushless motors are capable of continuous rotation, but lack the high acceleration capability that is often needed for optical scanning applications. Therefore there is a clear need in the art for a small motor that offers the continuous rotation capability of a brushless motor, as well as the high acceleration capability of a galvanometer-based optical scanner. The embodiments disclosed herein are aimed at fulfilling these, and other needs, in the art.

SUMMARY

In one embodiment of the present disclosure, a brushless motor may comprise a rotor and a stator, wherein the stator includes four deep slots arranged as two pairs of slots into which two or more coils are placed. The stator may also include a means to limit cogging torques, such as, for example, a non-uniform air gap between the slots.

In another embodiment of the present disclosure, a brushless motor may comprise a rotor and a stator, wherein the stator includes eight deep slots, with four of the slots being nearly, or about, twice as wide as the remaining four slots. Accordingly, one or more embodiments of the present disclosure provide a brushless motor comprising a stator defining an aperture extending axially therein and eight slots, wherein the eight slots consist of four wide slots and four narrow slots, and wherein the four wide slots are arranged as first and second pairs of opposing wide slots, the first pair generally aligned orthogonally to the second pair, and wherein each of the four narrow slots are positioned between two wide slots.

In yet another embodiment, the angles of the various slots relative to one another are greater than, equal to, or less than 45 degrees. In one or more embodiments, some of the slots may include more wire for greater torque over a limited range of angles, and less wire for less torque over an orthogonally separate limited range of angles.

One embodiment of the present disclosure comprises a small brushless motor formed with a stator having an aperture extending axially therein and four deep slots extending from the aperture to within the stator. The aperture is sized and shaped for accepting a rotor. The four slots may comprise first and second diametrically-opposed pairs of slots, wherein the first and second slot pairs are arranged orthogonally. For example, the first pair of slots may be oriented along a first axis, and the second pair of slots may be oriented along a second axis, wherein the first and second axes are generally or substantially orthogonal. At least one electrical coil is placed into each pair of slots. Due to the orthogonal arrangement of coils, this provides a two-phase, or sine/cosine, coil configuration excitable for providing bidirectional torque to the rotor. The rotor may have a two-pole diametral-magnetized magnet bidirectionally operable with the stator and extending into the aperture thereof, wherein a separation is formed between the magnet and the stator. Some embodiments may comprise a non-uniform separation formed between the magnet and the contoured ends that form a portion of the aperture between each of the slots. The non-uniform separation serves to limit cogging torques that might otherwise be present.

One embodiment of the present disclosure includes a motor comprising a stator defining an aperture extending axially therein. The stator may be formed from magnetically-conductive stacked laminations. A rotor having a two-pole diametral-magnetized magnet bidirectionally operable within the aperture is also disclosed, wherein a separation is formed between the magnet and the stator. First and second pairs of opposing slots may be formed within the stator, wherein the first pair of slots is generally aligned orthogonally to the second pair of slots. In one embodiment, a distance between an outer peripheral surface of the stator and the slots is greater than or equal to the depth of the slot. In another embodiment, a distance between an outer peripheral surface of the stator and the slots is less than or equal to the depth of the slot. Further, the stator may comprise contoured protrusions between the slots, the contoured protrusions defining either a uniform or non-uniform gap between the stator and the rotor.

A first electrical coil may be positioned within the first pair of slots, wherein the first electrical coil is excitable for (and thus configured for) providing bidirectional torque to the rotor over a first range of angles. The first range of angles may comprise any range of angles between and including, for example, −90 degrees to +90 degrees (180 degrees peak to peak) relative to a first axis.

A second electrical coil may be positioned within the second pair of slots, wherein the second electrical coil is excitable for (and thus configured for) providing bidirectional torque to the rotor over a second range of angles that are orthogonal to the first range of angles provided by the first electrical coil. The second range of angles may comprise any range of angles between and including, for example, −90 degrees to +90 degrees (180 degrees peak to peak) relative to a second axis that is orthogonal to the first axis.

Thus, in one embodiment, the first range of angles comprises a first limited range of angles and the second range of angles comprises a second limited range of angles. Since the first and second limited range of angles overlap, and since the first range of angles and second range of angles are orthogonal to one another, continuous rotation is possible given the appropriate excitation to the coils.

In one embodiment, a depth dimension of the slots is greater than a width dimension of the coils. In one embodiment, the first electrical coil comprises a first pair of electrical coils. In yet another embodiment, the second electrical coil comprises a second pair of electrical coils. The first electrical coil may comprise a cosine coil, and the second electrical coil may comprise a sine coil, or vice versa (i.e. a first sine coil and a second cosine coil).

In one embodiment of the present disclosure, exciting the first electrical coil produces torque over a first range of angles. In one embodiment, exciting the second electrical coil produces torque over a second range of angles.

Another embodiment of the present disclosure includes a stator defining an aperture therein for use in a brushless motor, the stator comprising a first pair of opposing slots configured for receiving a first electrical coil, and a second pair of opposing slots configured for receiving a second electrical coil. The second pair of slots are generally and/or substantially aligned orthogonally to the first pair of slots. The stator material may define a contoured surface between each slot. In one embodiment, a distance between an outer peripheral surface of the stator and at least one slot is at least as great as a depth dimension of a slot. In one embodiment, the slots each define a non-uniform curvature of stator material.

Yet another embodiment of the present disclosure includes a brushless motor comprising a stator defining an aperture extending axially therein; a rotor having a magnet bidirectionally operable within the aperture, wherein a separation is formed between the magnet and the stator; a first pair of slots formed within the stator; a second pair of slots formed within the stator, the second pair of slots generally aligned orthogonally to the first pair of slots; a first electrical coil within the first pair of slots, wherein the first electrical coil is excitable for providing bidirectional torque to the rotor over a first limited range of angles; and a second electrical coil within the second pair of slots, wherein the second electrical coil is excitable for providing bidirectional torque to the rotor over a second limited range of angles that are orthogonal to the first limited range of angles provided by the first electrical coil. In one embodiment, the magnet comprises a two-pole diametral-magnetized magnet.

All embodiments may use coils that are pre-formed external to the stator using bondable magnet wire. These coils generally have a racetrack shape, and whose shape can be retained after the coil is formed. Coils may be wound using wire having a round cross-section and made as described in U.S. Pat. No. 9,530,559. Alternatively coils may be wound using a spiral (center-to-outer) technique using rectangular wire. Either way, the coils are made very thin.

"Slot guards" made of material that provides electrical insulation may be placed at the axial top and bottom of the stator. These slot guards have slots that overlay some or all of the stator slots, but whose width and slot depth are smaller.

The pre-formed coils may then be inserted into the slots, and have their end-turns folded over the stator at the axially-top and -bottom surfaces of the stator, allowing the end-turns to not take up much axial-space, thus providing the most axially-compact way of making a slotted motor. The "slot guards" keep the wire away from the walls of the stator by a small amount (for example, 0.002 inches), thus the slots are mostly filled with the copper motor coil windings.

Finally, thermally-conductive epoxy may be injected into the space between the coil windings and the stator. The small space between the coil windings and the slots, coupled with the thermally-conductive nature of the epoxy provide a very strong path to remove heat from the coil windings.

BRIEF DESCRIPTION OF THE DRAWINGS

For a fuller understanding of the embodiments disclosed herein, reference is made to the following detailed description, taken in connection with the accompanying drawings illustrating various embodiments of the present disclosure, in which.

DETAILED DESCRIPTION OF EMBODIMENTS

Figure 1:
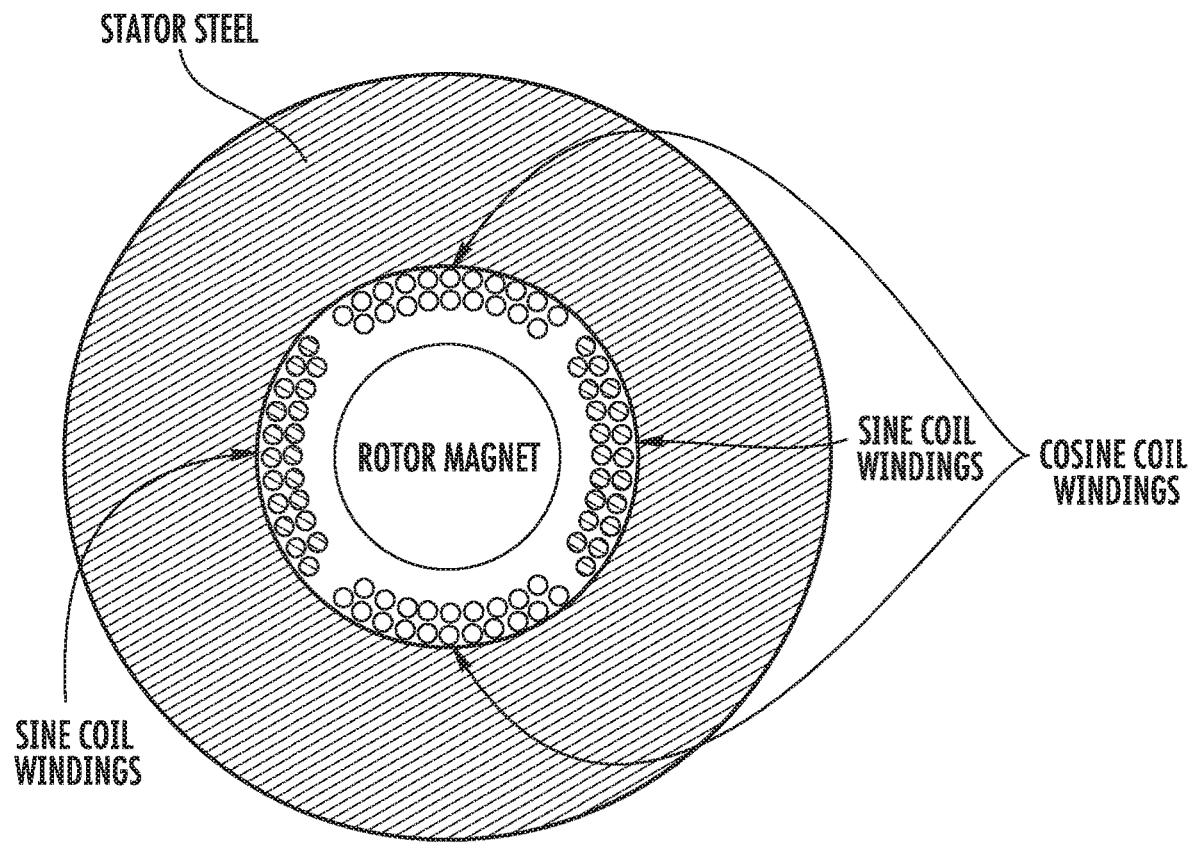
FIG. 1 is a top, cross-sectional view of a typical prior art slotless motor.
Figure 2:
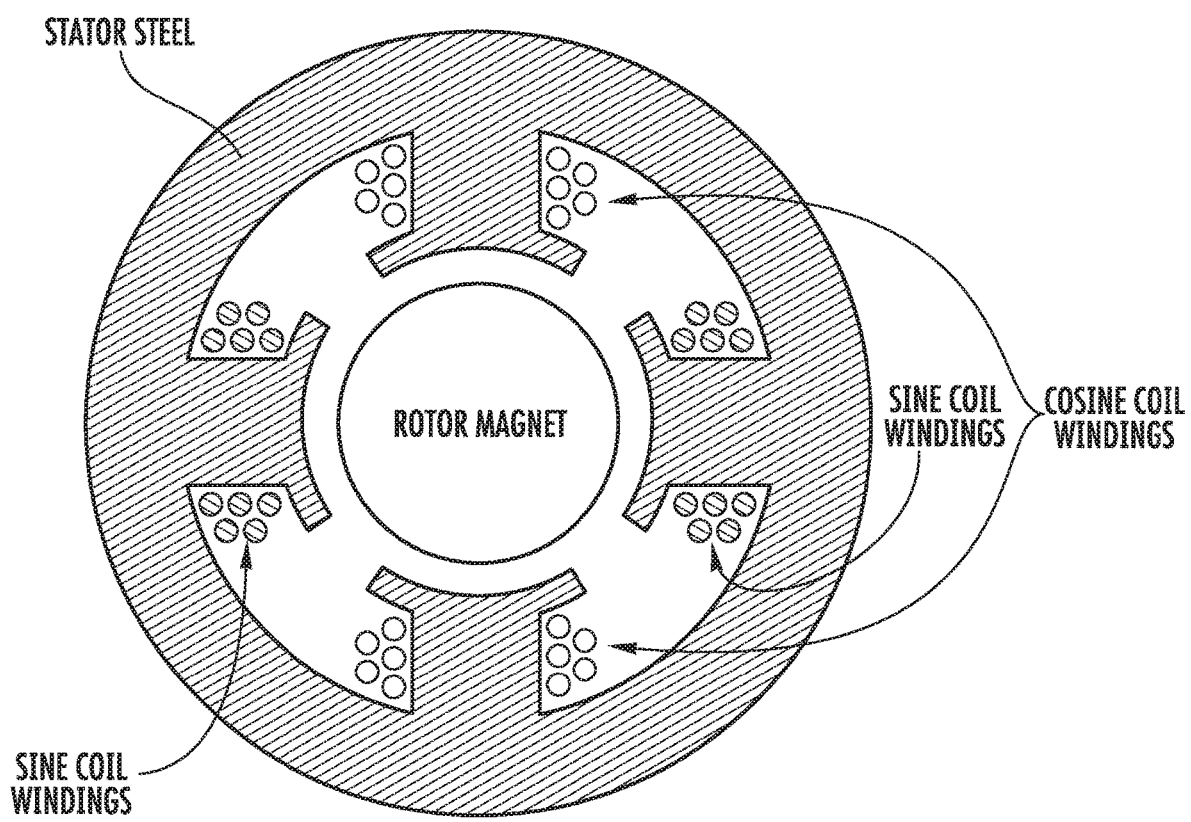
FIG. 2 is a top, cross-sectional view of a typical prior art toothed motor.
Figure 3:
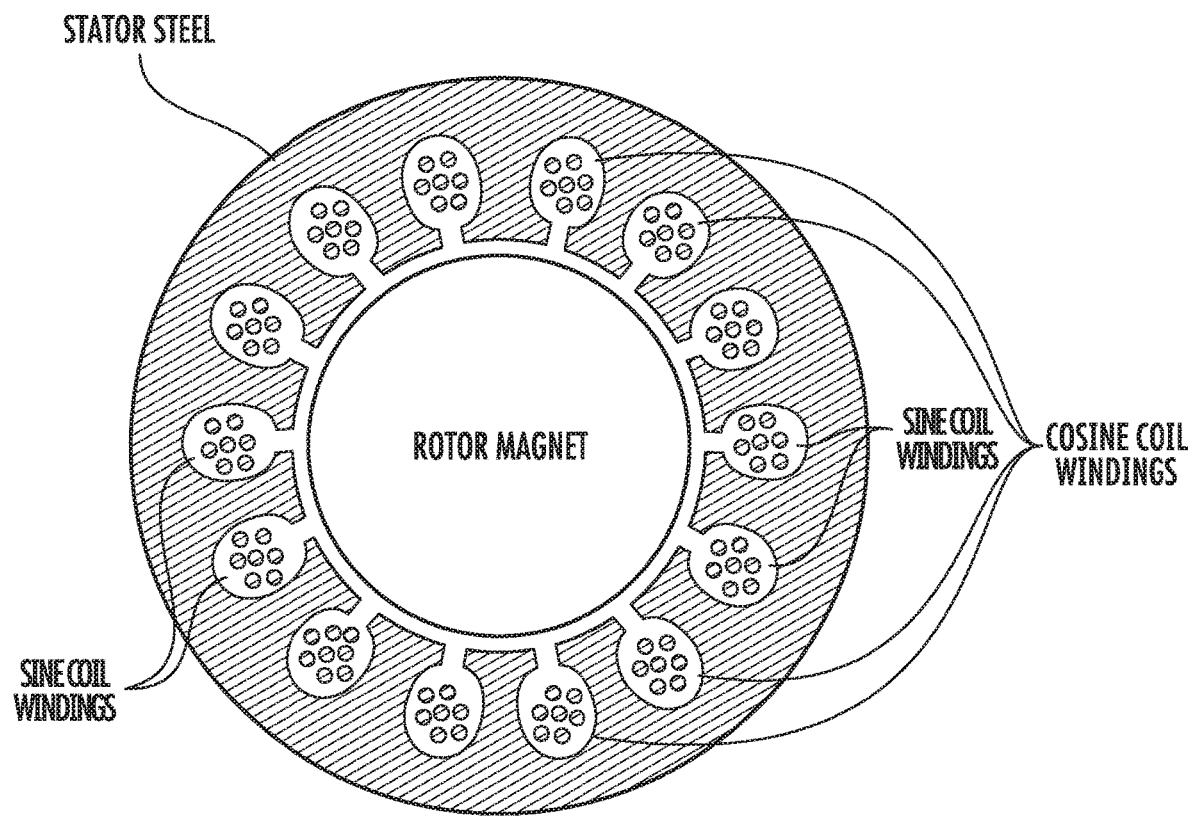
FIG. 3 is a top, cross-sectional view of a typical prior art slotted motor.

The present invention will now be described more fully hereinafter with reference to the accompanying drawings, in which preferred embodiments of the invention are shown. This invention may, however, be embodied in many different forms and should not be construed as limited to the embodiments set forth herein. The embodiments disclosed herein are provided so that this disclosure will be thorough and complete, and will fully convey the scope of the embodiments to those skilled in the art. One of ordinary skill in the art, having the benefit of the present disclosure, will appreciate that the various elements of the several embodiments may be rearranged and/or combined without departing from the scope of the present disclosure.

Reference throughout this specification of "one embodiment"; "an embodiment"; "one or more embodiments"; or the like means that a particular feature, structure, step, or characteristic described in connection with the embodiment is included in at least one embodiment. Thus, appearances of the phrases "in one embodiment"; "in an embodiment"; "one or more embodiments"; or the like in various places throughout this specification are not necessarily all referring to the same embodiment. Moreover, the individual elements of an embodiment or steps in a method may be interchanged between the various exemplary embodiments without departing from the scope of the present disclosure.

In addition, for the purpose of promoting an understanding of the principles of the present disclosure, reference will now be made to the embodiments described herein, and specific language will be used to describe the same. It will, nevertheless, be understood that no limitation of the scope of the disclosure is thereby intended, and any alterations and further modifications of the described or illustrated embodiments and any further applications of the principles of the disclosure as illustrated herein are contemplated as would normally occur to one skilled in the art to which the disclosure relates. All limitations of scope should be determined in accordance with and as expressed in the eventual claims of one or more issued patents.

Unless defined otherwise, all technical and scientific terms used herein have the same meaning as commonly understood by one of ordinary skill in the art to which the subject matter of this disclosure belongs. Although any methods and materials similar or equivalent to those described herein can be used in the practice or testing of the present embodiments, exemplary preferred methods and materials are described.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, or ±10%, or ±5%, or ±1%, or ±0.1% from the specified value, as such variations are appropriate to prepare the disclosed compositions and perform the disclosed methods.

Figure 4:
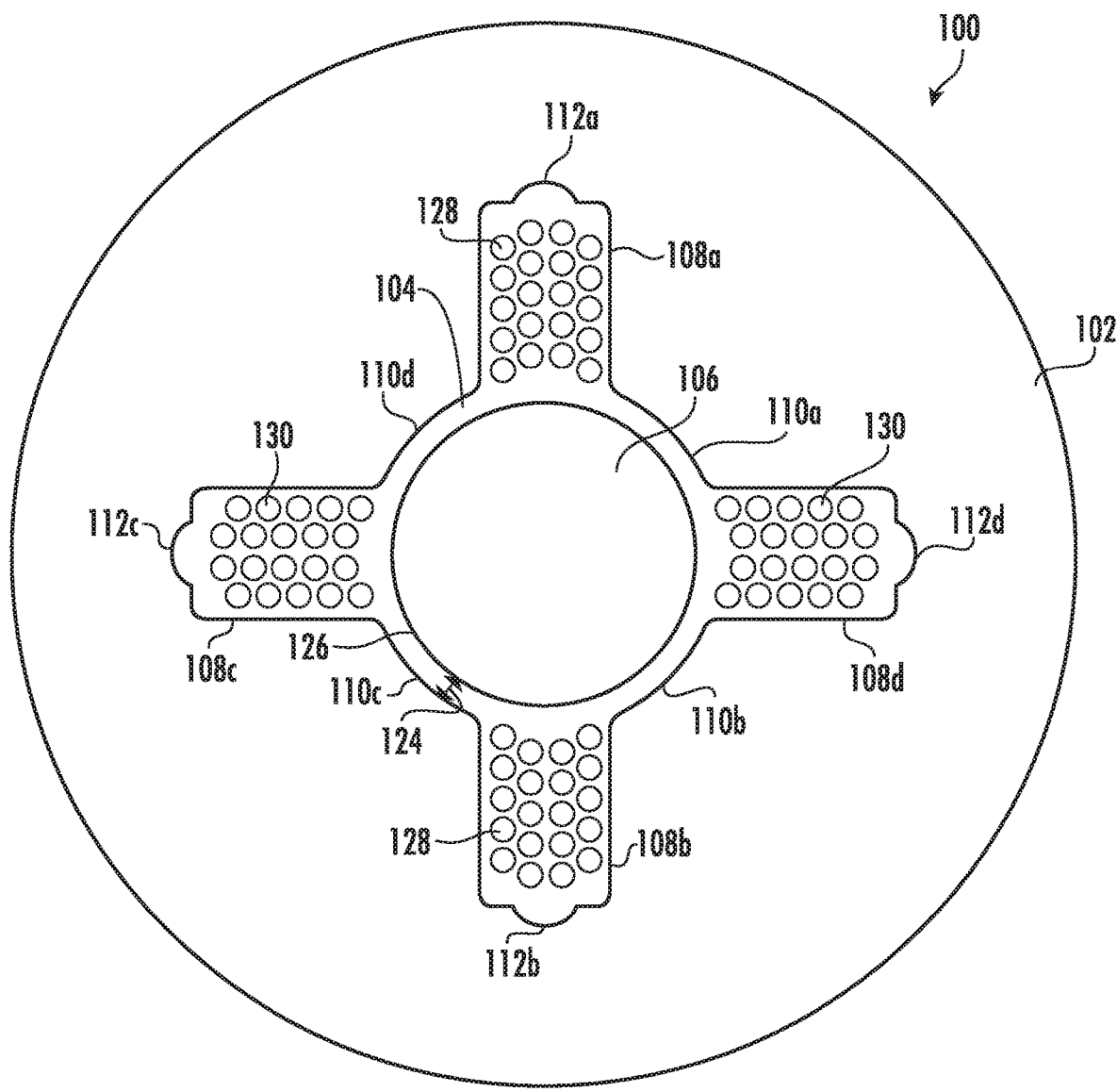
FIG. 4 is a top, cross-sectional view of an embodiment of the present disclosure, depicting a four-slot stator, rotor, and coil windings.
Figure 5:
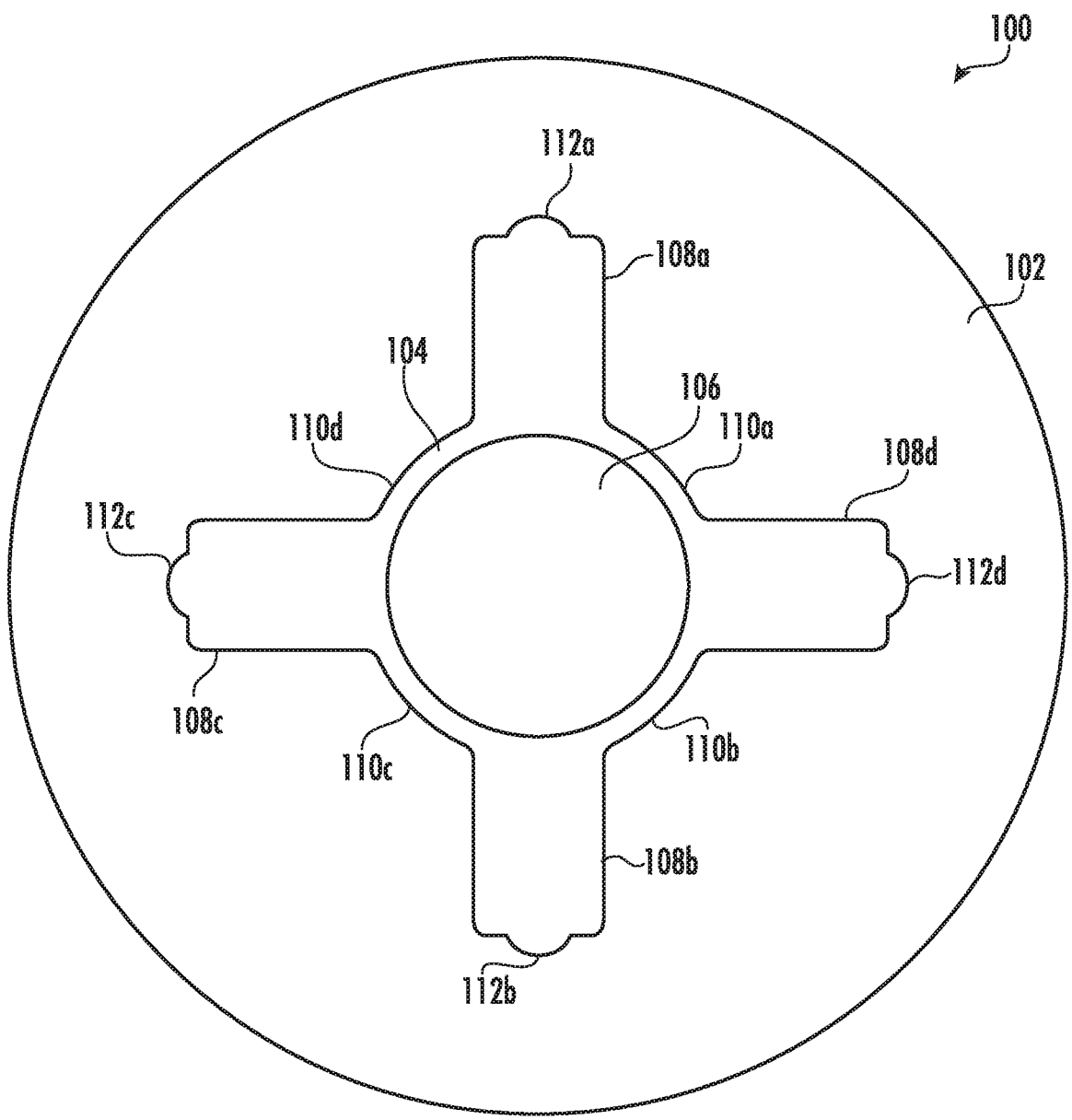
FIG. 5 is a top, cross-sectional view of an embodiment of the present disclosure, depicting a four-slot stator and rotor.
Figure 6:
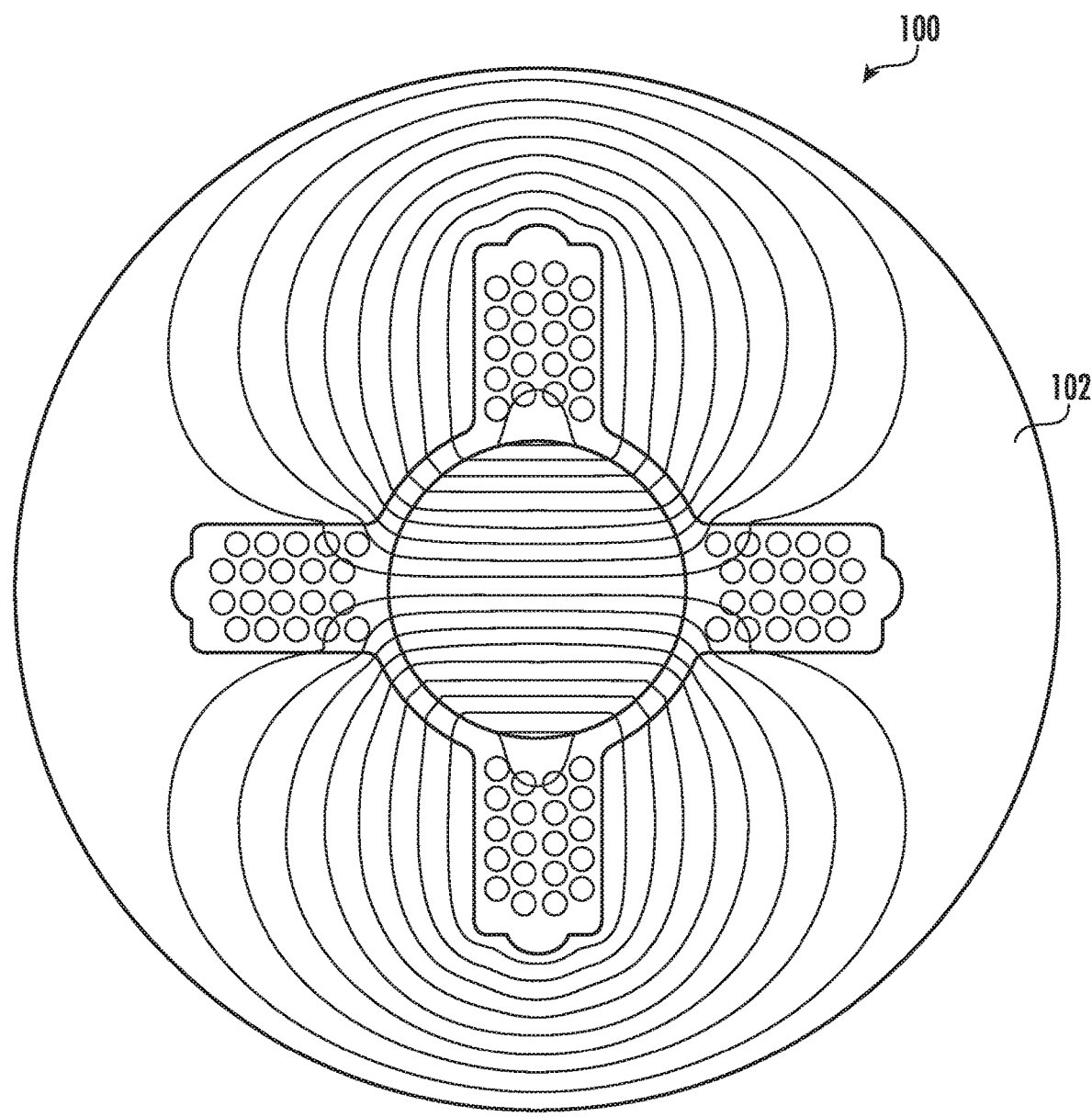
FIG. 6 is a top, cross-sectional view of an embodiment of the present disclosure, depicting how flux lines flow through a four-slot embodiment.

Referring initially to FIGS. 4-6, one embodiment of the present disclosure comprises a small brushless motor 100. The motor includes a stator 102 defining an aperture 104 extending axially therein, wherein the aperture 104 is sized and shaped for receiving a rotor 106. In one embodiment, the aperture 104 defines four slots 108 a-d and four contoured ends 110 a-d between the slots. The slots defined by the stator may further define notches 112 a-d, said notches defined by an absence of stator material at an end of a slot distal the aperture.

Figure 25:
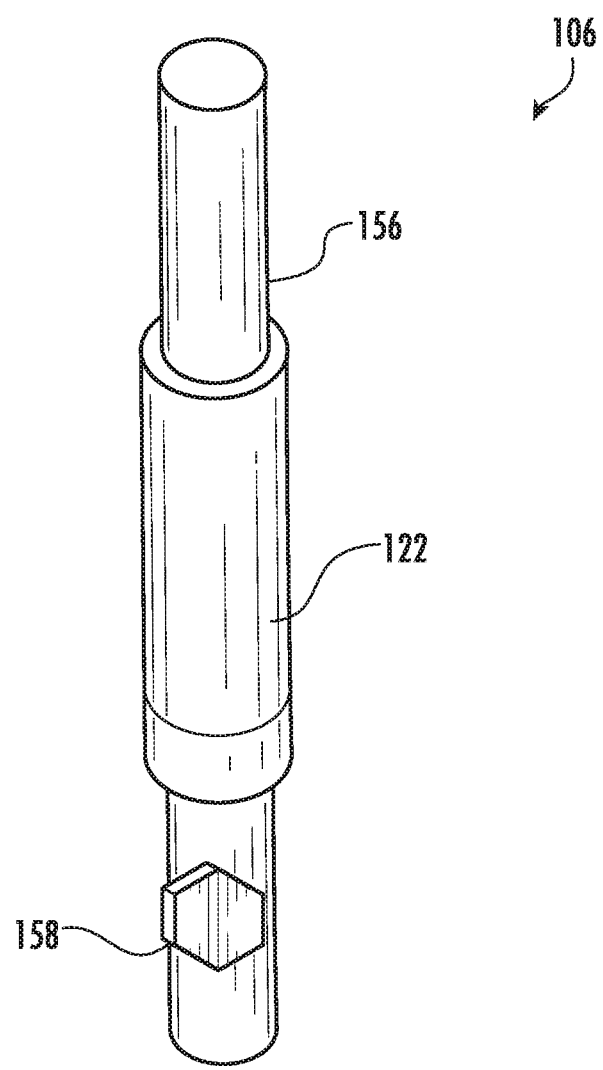
FIG. 25 is a perspective view of an exemplary rotor construction of the present disclosure.

As depicted in FIGS. 4 and 25, an embodiment of a rotor 106 comprises a two-pole diametral-magnetized magnet 122 bidirectionally operable with the stator 102 (FIG. 4) and configured for extending into the aperture 104. A separation 124, such as an air-gap, is formed between an outer surface 126 of the rotor 106 and the contoured ends of the aperture 110a-d, between the slots 108a-d.

In one embodiment, the four slots 108a-d (first 108a, second 108b, third 108c, and fourth 108d slots) comprise diametrically-opposed pairs of slots, arranged orthogonally. Thus, as depicted in FIG. 4, one of the pairs of slots may be oriented vertically, or along a first axis, (108a, 108b), and the other pair may be oriented horizontally, or along a second axis, (108c, 108d). The slots 108a-d define areas where electrical coils 128, 130 may be inserted.

In order to fit electrical coils 128, 130 into the slots 108a-d, and also have a desirable conductor packing density, the coils 128, 130 are externally preformed and preferably made as described in U.S. Pat. No. 9,530,559 (the "'559 patent"), the entirety of which is incorporated by reference. Specifically, the coils 128, 130 used in connection with embodiments of the present disclosure are best formed such that they generally define a "racetrack" shape as shown in FIG. 7 of the '559 patent. Other suitable coil configurations, however, are within the scope of the present disclosure, including coils that use rectangular wire.

Figure 8A:
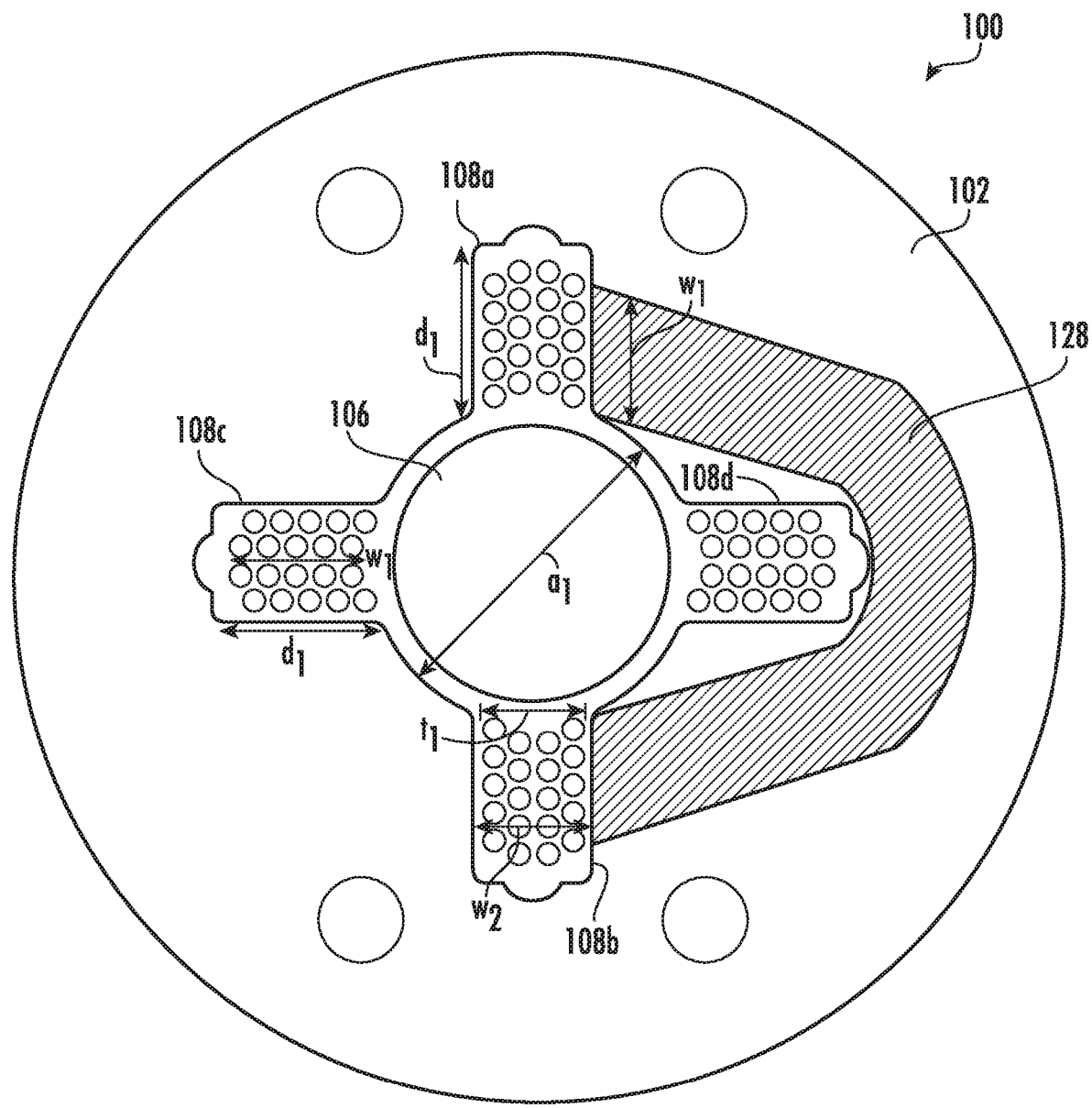
FIG. 8a is a top, cross-sectional view of an embodiment of the present disclosure illustrating exemplary end-turns of the electrical coil windings.
Figure 8B:
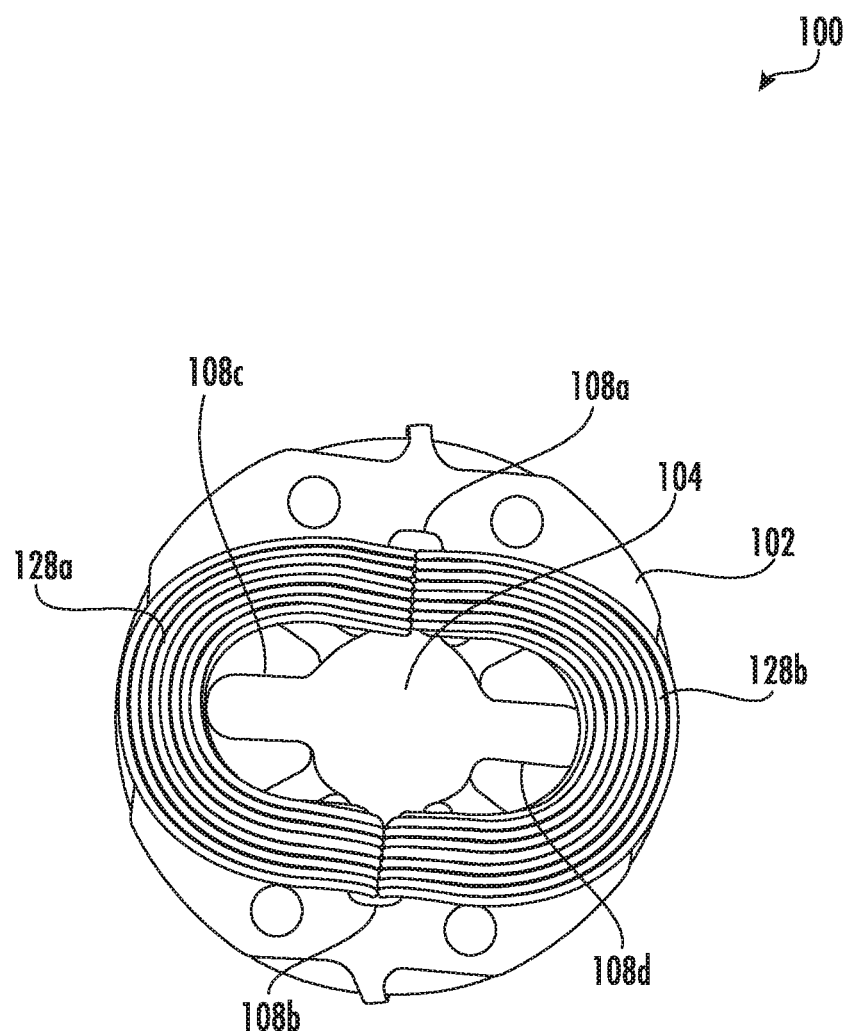
FIG. 8b is a top view of an embodiment of the present disclosure illustrating one manner in which the first, or cosine, coil windings may be inserted.

In one embodiment, each slot 108*a-d* is sized such that the depth dimension d1 of the slot is greater than a width dimension w1 of a coil 128, 130 (see FIG. 8A). Likewise, a width dimension of each slot w2 may be greater than a thickness dimension t1 of the coil (or pair of coils as further described below).

During assembly of an embodiment described herein, and as depicted in FIGS. 8*a*-9*b*, a first electrical coil 128 is inserted into the vertically-oriented, or first, slot pair 108*a*, 108*b* (referred to as the "cosine coil" in this example). Once the first coil 128 is inserted into the vertically-oriented slot pair 108*a*, 108*b*, the ends of the coil (referred to as "end-turns") are folded over in such a way that these end-turns do not occlude the horizontally-oriented, or second, slot pair 108*c*, 108*d*. This coil configuration is depicted in FIG. 8*b*. This enables an unimpeded insertion of a second electrical coil 130 into the horizontally-oriented slot pair 108*c*, 108*d* (referred to as the "sine coil" in this example).

The coil(s) may comprise magnet wire, which is typically copper wire having an electrically insulating varnish over top. The insulating varnish prevents the turns of the coil from shorting out against other turns of the coil, and also prevents turns of the coil from shorting out against the stator material, which is electrically conductive.

Although it is possible, using coils that are made in a conventional manner and having a conventional thickness, to insert a first coil into the vertical slot pair (the cosine coil), and a second coil into the horizontal slot pair (the sine coil), thus having only a single coil for each of the sine and cosine drive, it may be difficult in some instances to fold the end-turns of each coil over as desired. This is because the coils used in connection with embodiments of the present disclosure are externally pre-formed and preferably using "bondable" magnet wire as described in U.S. Pat. No. 9,530,559, the contents of which are incorporated by reference. Coils that are thick enough to take up the entire width of a slot would have several layers of round magnet wire all bonded together, or spiral layers of rectangular wire. This may make it difficult to fold without damaging the magnet wire. For that reason, it is preferable, in one embodiment, to insert a pair of coils (i.e. first pair 128*a*, 128*b*; second pair 130*a*, 130*b*) into each slot pair, wherein a combined thickness of the two coils is less than a width of the slot. Once the coils are inserted into the slots and the end-turns are folded over, the coil wires within each pair may be connected in series or parallel for driving externally.

Figure 9A:
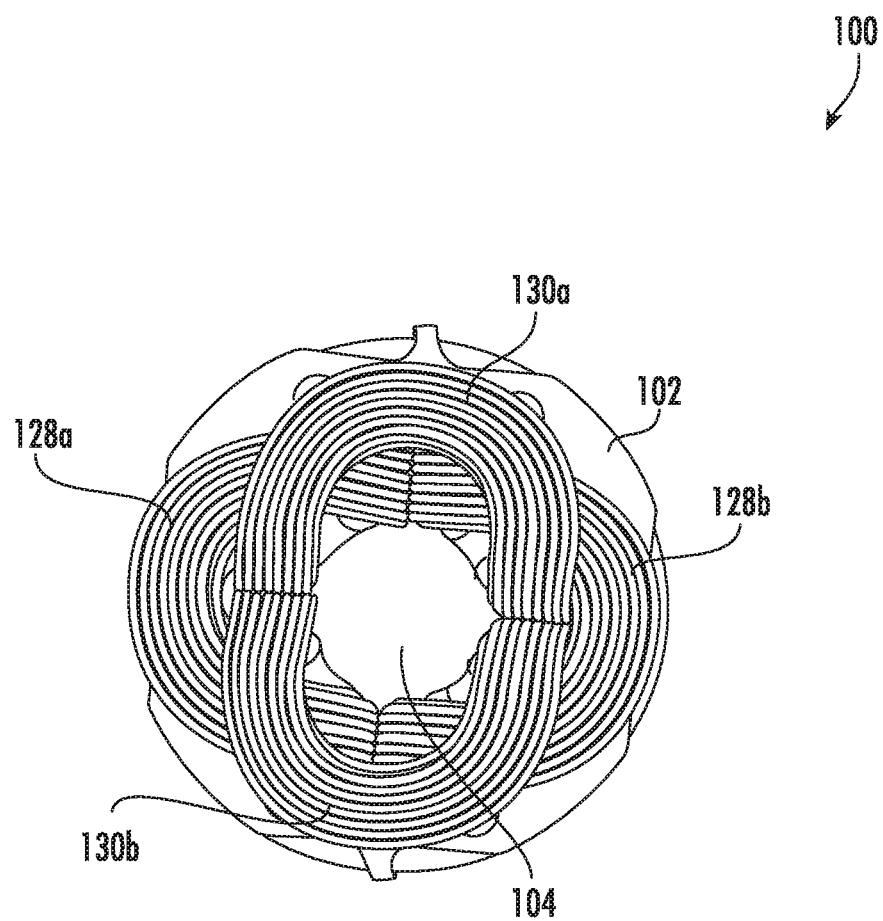
FIG. 9a is a top view of an embodiment of the present disclosure illustrating one manner in which the second, or sine, coil windings may be inserted with end turns on top of the cosine coil windings.
Figure 9B:
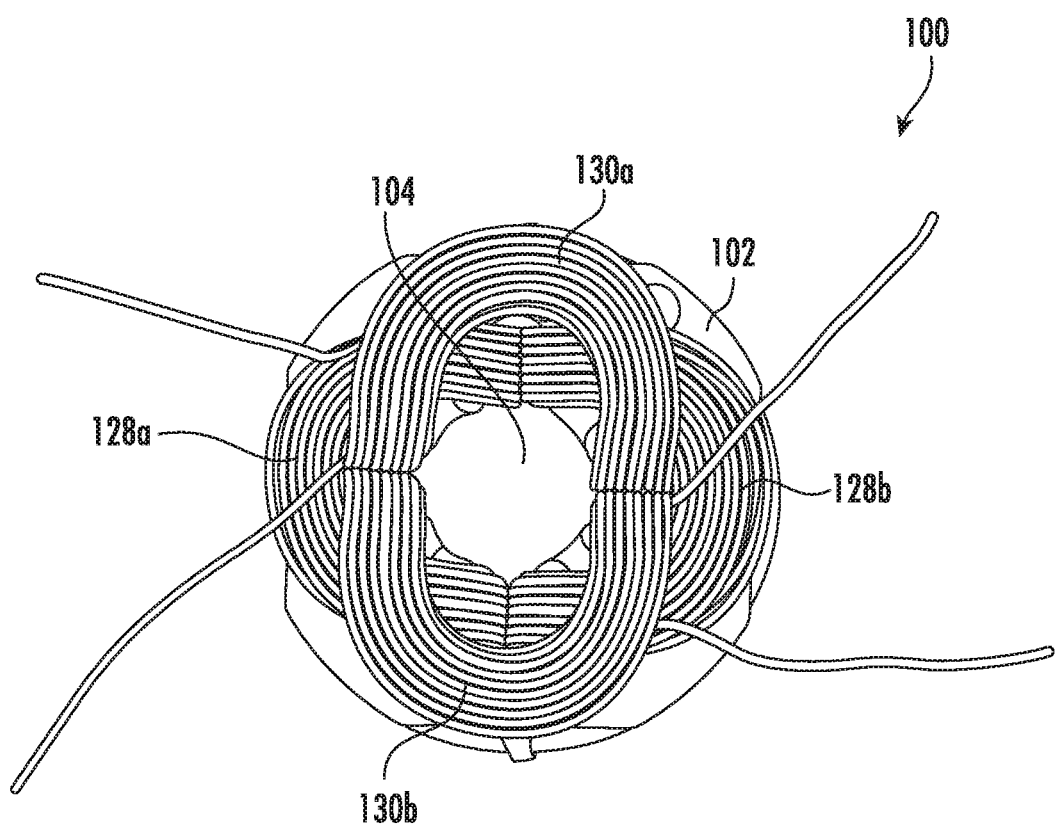
FIG. 9b is a bottom view of the embodiment of FIG. 9a illustrating four coil wires (two for the first coil and two for the second coil)

Once the cosine coil (or first pair of coils) is inserted into the vertical, or first, slot pair and end-turns folded over, the sine coil (or second pair of coils) can be inserted into the horizontal, or second, slot pair. The end-turns for the sine coils are folded over such that they are essentially on top of the end-turns of the cosine coils, as shown in FIG. 9*a* and FIG. 9*b*. Since the coils 128*a*, 128*b*, 130*a*, 130*b* are each very thin, when the end-turns are folded over they do not occupy much axial space (approximately equivalent to twice the thickness of a single coil). This improves efficiency and also allows the motor to be more compact than motors manufactured in the conventional way. Once both the cosine-coil and sine-coil are inserted and end-turns folded over, the aperture is unobstructed, and can receive the rotor 120 of the present disclosure.

Thus, one embodiment of the present disclosure includes a method for assembling a motor, the method comprising (i) procuring a stator defining an aperture extending axially therein, the stator having a first pair of opposing slots configured for receiving a first electrical coil and a second pair of opposing slots configured for receiving a second electrical coil, the second pair of slots generally aligned orthogonally to the first pair of slots; (ii) inserting a first coil into the first pair of opposing slots in such a way that the end-turns of the first coil do not occlude the second pair of opposing slots or the aperture; (iii) inserting a second coil into the second pair of opposing slots in such a way that the end-turns of the second coil do not occlude the aperture. The method may further comprise inserting a rotor into the aperture. In one embodiment, the rotor comprises a two-pole diametral-magnetized magnet. In one embodiment, the first coil 128 comprises a pair of coils 128*a*, 128*b* connected in series or in parallel. In one embodiment, the second coil 130 comprises a pair of coils 130*a*, 130*b* connected in series or in parallel.

In embodiments wherein the first and second coils comprise first and second pairs of coils, respectively, a method for assembling a motor having a stator defining first and second slot pairs and an aperture, wherein the first slot pair is generally, or substantially, orthogonal to the second slot pair, comprises (i) inserting a first coil into the first slot pair; (ii) folding the end turns of the first coil orthogonally from an axis of the first coil and toward the stator in such a way that the end turns do not occlude a slot in the second slot pair; (iii) inserting a second coil into the first slot pair; (iv) folding the end turns of the second coil orthogonally from an axis of the second coil and toward the stator in such a way that the end turns do not occlude a slot of the second slot pair; (v) inserting a third coil into a slot of the second slot pair; (vi) folding the end turns of the third coil orthogonally from an axis of the third coil and toward the stator in such a way that the end turns do not occlude a slot of the first slot pair and the aperture; (vii) inserting a fourth coil to a slot of the second slot pair; and (viii) folding the end turns of the fourth coil orthogonally from an axis of the fourth coil and toward the stator in such a way that the end turns do not occlude a slot of the second slot pair and the aperture.

The electrical coils 128, 130 may be excitable for providing bidirectional torque to the rotor 106. Notably, energizing a single coil will not provide continuous rotation. Energizing the cosine coil alone will cause the north/south pole orientation of the rotor magnet to become aligned orthogonal to that coil, after which no further rotation would take place. Fortunately, once the rotor is in that position, energizing the sine coil will cause the rotor magnet to rotate in a direction orthogonal to the sine coil and parallel to the cosine coil. Thus, each individual coil produces torque over only a limited range of angles, and the actual rotor magnet direction and torque depends on the current flowing through the coils and how that current is coordinated. Continuous rotation requires the coils to be energized sequentially in a sine/cosine drive fashion.

Figure 11:
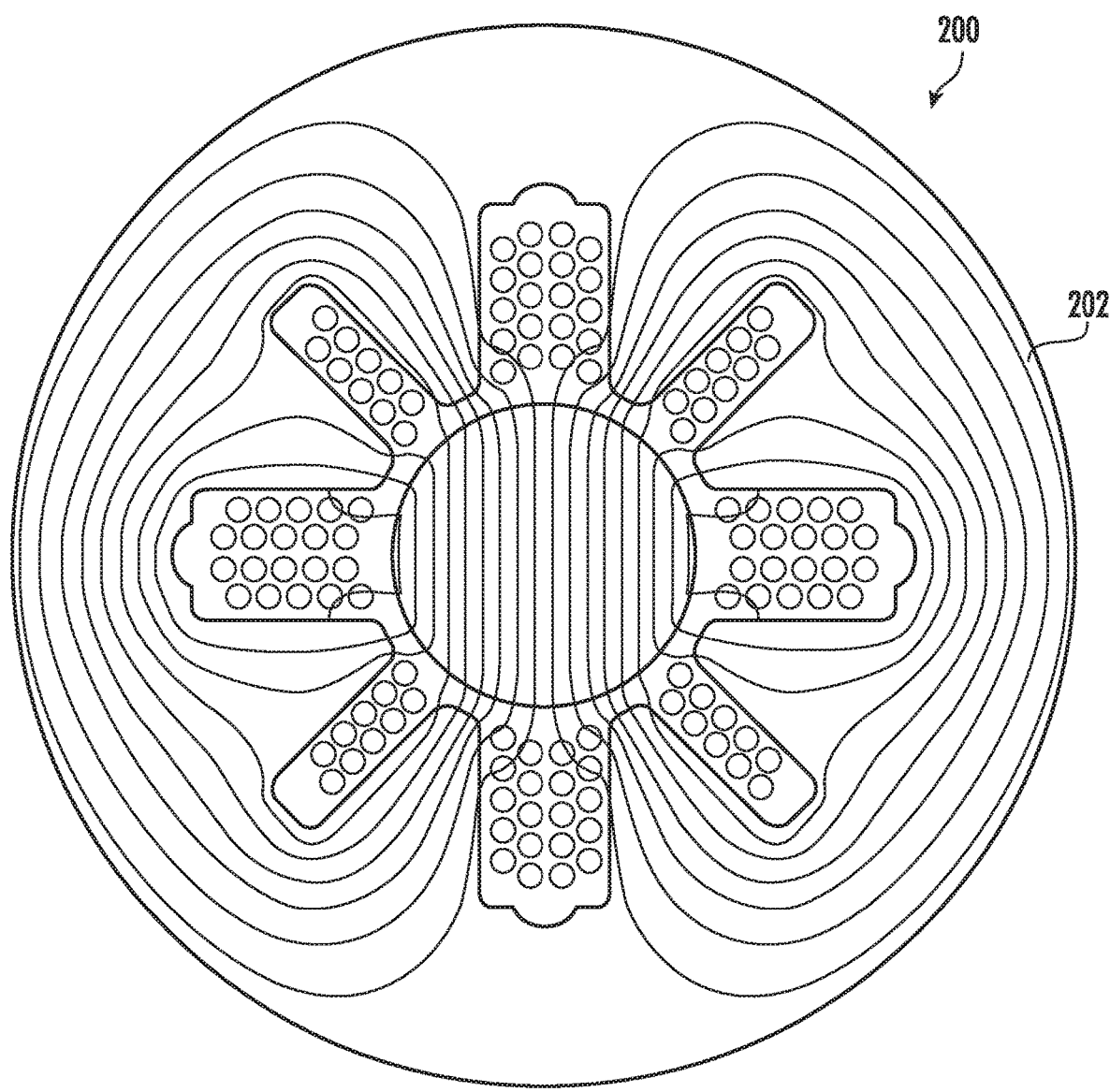
FIG. 11 is a top, cross-sectional view of an embodiment of the present disclosure, depicting how flux lines flow through an eight-slot embodiment.

As depicted in FIG. 11, the stator 102 may comprise multiple, thin, sheets of metal, herein referred to as laminations 154. The laminations 154 may be assembled to form a desired exterior and interior shape. The shape of each lamination 154 may be created by metal stamping, laser cutting, photo-etching, water-jet cutting, or other known methods of forming a shape from sheet metal. The laminations 154 may be made from a silicon-steel material known as M-19, a material specially made for motors and electrical transformers. However, many different materials will work, as long as the material is magnetically conductive. A few possible alternative materials include a cold-rolled steel (such as Q-195) and magnetic stainless steel (such as stainless steel 416).

In one embodiment, the stator 102, which is illustrated in cross section in FIG. 4, comprises a cylindrical outer shape. It will be understood by those skilled in the art, having the benefit of the teachings of the present disclosure, that alternative shapes may be employed in connection with embodiments of the present disclosure, such as, for example, the rectangular cross section shape of the motor 100A shown in FIG. 11, without departing from the teachings of the present disclosure.

In one embodiment, the outer dimensions of the stator 102 are sized such that there is enough magnetic material between the deep, or distal, end of each slot and the outside of the stator, such that the stator material is sufficient to conduct the magnetic flux. The outside diameter of the stator may also provide sufficient room so that when the end-turns are folded over, they do not exceed the outside diameter of the stator steel. This generally means that the distance between the outside diameter of the stator and the slot must be at least as great as the depth dimension of a slot.

To increase efficiency further, the slots can be made deeper so that more turns of electrical coil can fit within the slots. As described above, this will generally require that the outside diameter of the stator also be increased proportionally. As the slots become deeper, the end-turns of each electrical coil must become longer. At a certain dimension, the length of the end-turns will exceed the length of the conductors that are within the stator slots. Since the end-turns do not contribute to torque, but do contribute to weight, electrical resistance, heat (due to current flowing through the end turns, which have electrical resistance), and electrical inductance, it therefore follows that in order to maximize motor efficiency, it is desirable to maximize the height of the stator and minimize the length of the end-turns within practical limits.

In one or more embodiments, once the stator is assembled and coils are inserted, the coils may be retained in place with, for example, a thermally-conductive epoxy. Such epoxy also helps to conduct any heat produced by the coils to the stator.

As depicted in FIG. 25, the rotor magnet 122 for use in connection with one or more embodiments comprises a neodymium iron boron material. The rotor magnet 122 may be integrally formed with, or configured for attachment to, a shaft 156, wherein the shaft carries an optical element 158 attached thereto. The optical elements may comprise a mirror, prism, grating disk, aperture wheel, or any other suitable item.

Figure 10:
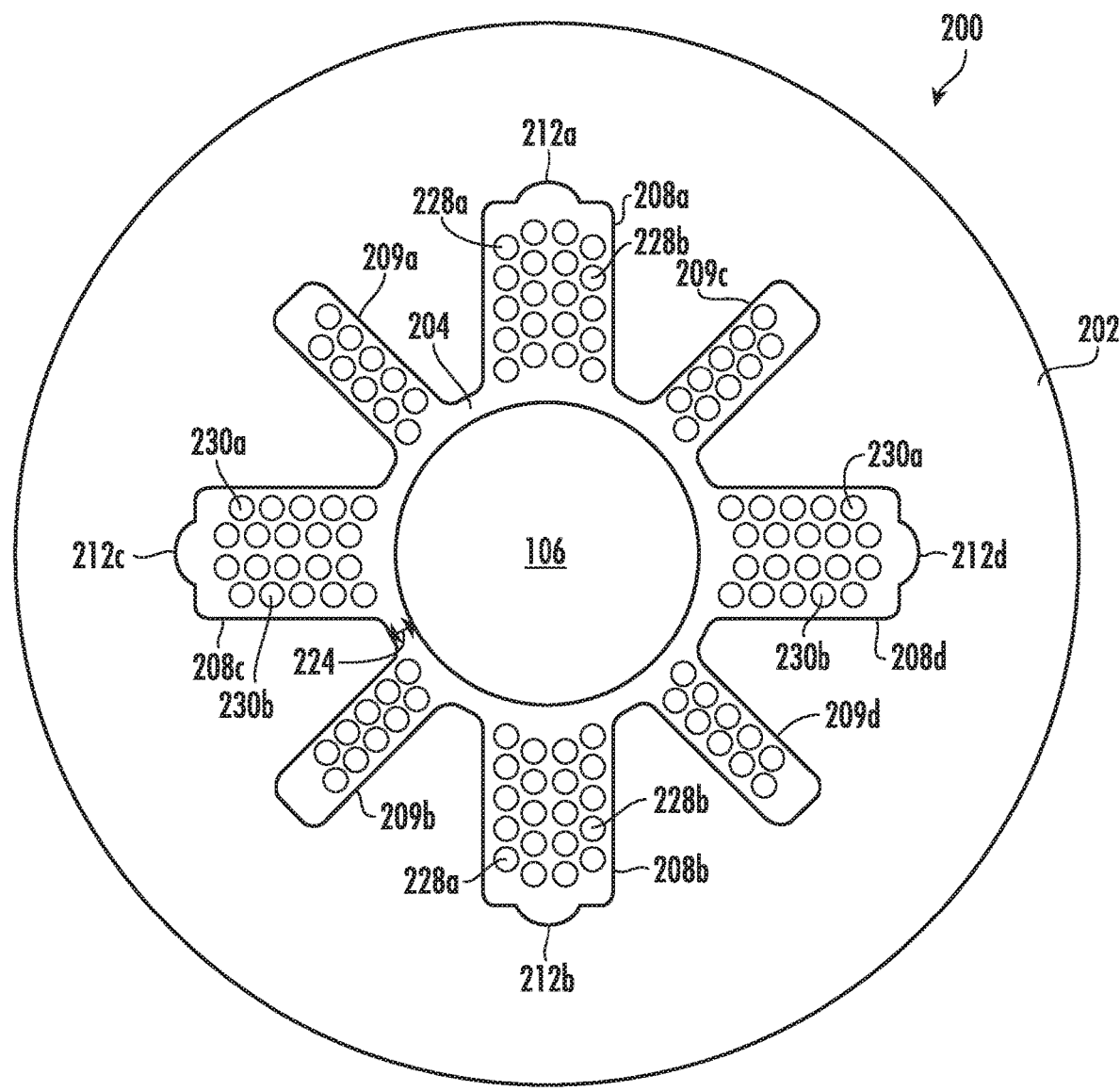
FIG. 10 is a top, cross-sectional view of an embodiment of the present disclosure, depicting an eight-slot stator, rotor, and coil windings.

With continued reference to FIG. 10, the shaft 156 may be made of stainless steel, although practically any material can be used so long as the material can withstand the torque and radial loads produced by the motor 100 and any external load connected to the motor within the environment being operated. As above described, the shaft 156 may be integrally formed with the rotor magnet 122 or may be attached to the magnet using adhesives such as epoxy.

In one or more embodiments, the rotor magnet 120 is a single cylindrical magnet that is diametral magnetized. The rotor 120 may also be made from two or more magnets, so long as the combination of magnets provides a north pole diametrically opposed from a south pole. Thus, other suitable magnets are considered to be within the scope of the present disclosure.

By using a cylindrical rotor magnet 122 that is diametral magnetized, a sinusoidal flux-versus-angle profile results from the magnet. This, in turn, produces an approximately sinusoidal back-EMF profile and correspondingly sinusoidal output-torque versus angle profile for each coil. Since the slots (and thus the coils) are arranged orthogonally, a sine/cosine relationship results.

Note that the rotor magnet 122 may be made from any magnet material. However, highest performance is currently achieved by using neodymium iron boron N48H or better for the rotor magnet.

Figure 7A:
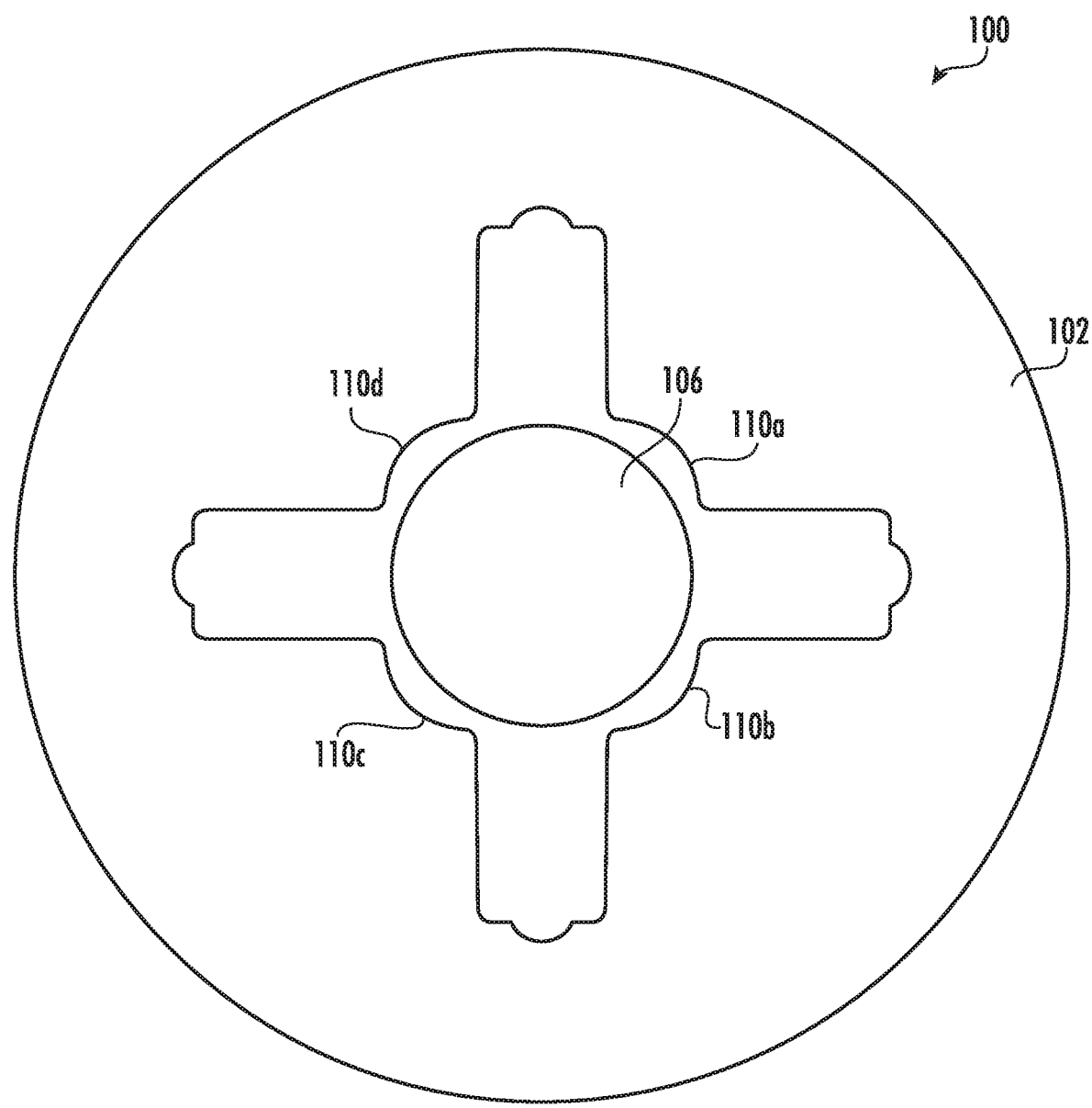
FIG. 7a is a top, cross-sectional view of another embodiment of the present disclosure, wherein an air gap between the rotor and four-slot stator is non-uniform.
Figure 7B:
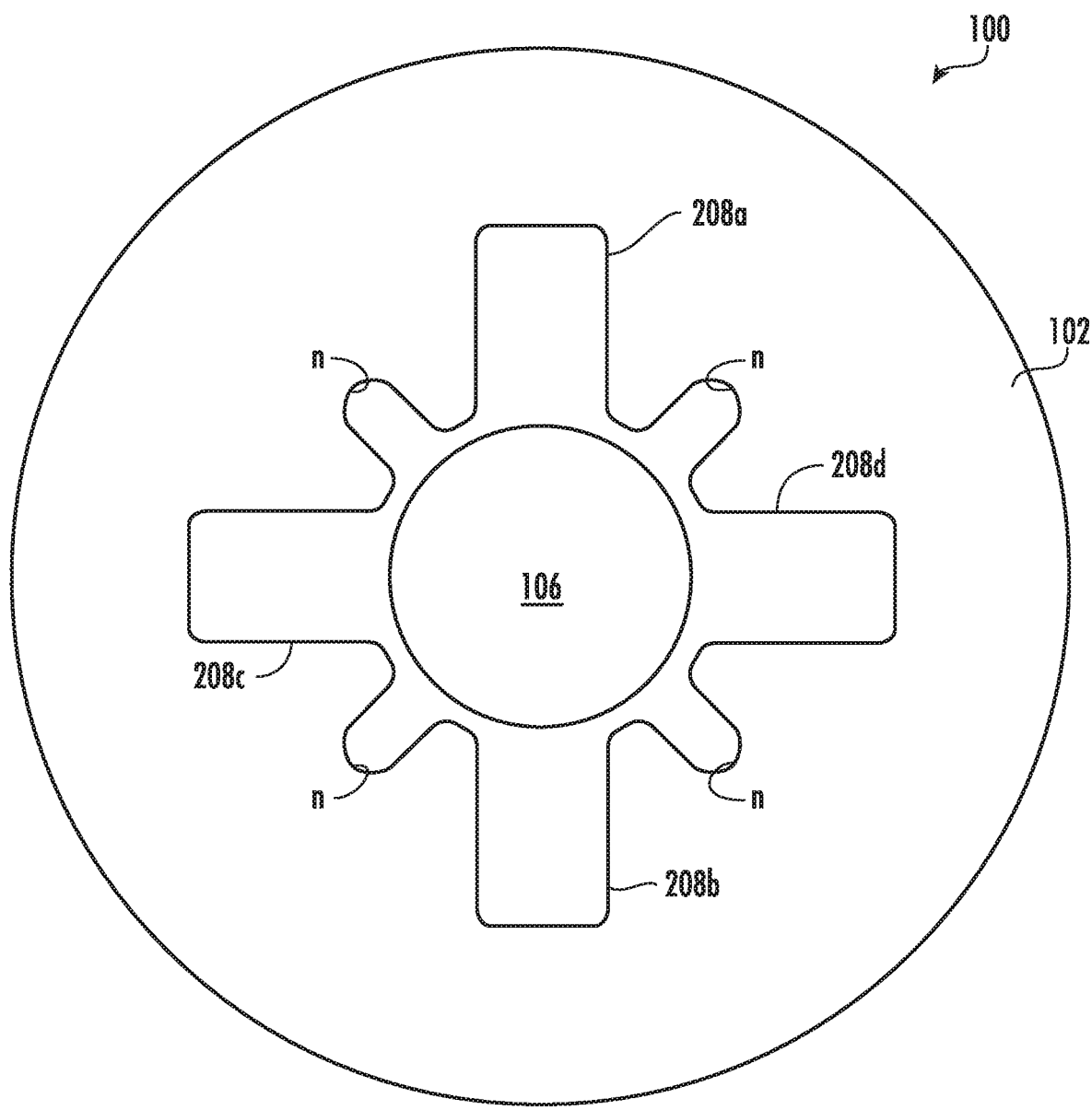
FIG. 7b is a top, cross-sectional view of another embodiment of the present disclosure, wherein the contoured ends between the four large slots contain four additional short slots.

With continued reference to FIGS. 4 and 5, the rotor 106 sits in an aperture 104 defined by the stator 102. In one embodiment, the stator 102 has high magnetic permeability. The aperture 104 also has first 108*a*, second 108*b*, third 108*c*, and fourth 108*d* slots having very low magnetic permeability. Because of this, as the north/south poles of the rotor magnet 122 of the rotor 106 rotates, these poles are attracted to areas of the stator 102 where the stator material resides as opposed to the slot areas. Thus, the motor may experience cogging (sometimes referred to as "reluctance torques") as the rotor 106 is rotated. The embodiment shown in FIG. 7*a* illustrates one possible way to reduce cogging. In this embodiment, there is a non-uniform gap between the contoured ends of the stator and the rotor 106. The embodiment shown in FIG. 7*b* illustrates another possible way to reduce cogging. In this embodiment, there is a notch n carved into the contoured ends of the stator and the rotor 106. In the embodiments illustrated in FIGS. 7*a* and 8*b*, the increased air-gap in the middle of each contoured end makes that area of the stator 102 less attractive to the magnet 122, thus reducing cogging. Notably, however, even without the non-uniform gap or other cogging reduction means, the amount of cogging experienced by the rotor 106 may already be acceptably low for many applications. Also note that cogging that does exist tends to orient the north-south magnet poles toward the teeth and away from the slots.

To understand the benefits provided by embodiments of the present disclosure, the following are specifications of motors built in accordance with the embodiment depicted in FIG. 4. Such motors were built with a stator 102 having an outside diameter of 10.7 mm (0.420 inches), and having an inside diameter of the aperture of 0.136 inches, with each slot being 0.048 inches wide and 0.071 inches deep. The stator 102 was made from a stack of 0.014-inch-thick laminations made of M19 silicon steel having the shape shown in FIG. 4 and the laminations stacked to a collective height of 27.4 mm (1.08 inches).

The exemplary rotor magnet 122 was made with high-grade Neodymium Iron Boron magnet material, having a diameter of 0.12 inches and length of 1.3 inches, attached to stainless steel shafts as described above, corresponding to a rotor inertia of 0.028 GM*CM$^2$.

Figure 18:
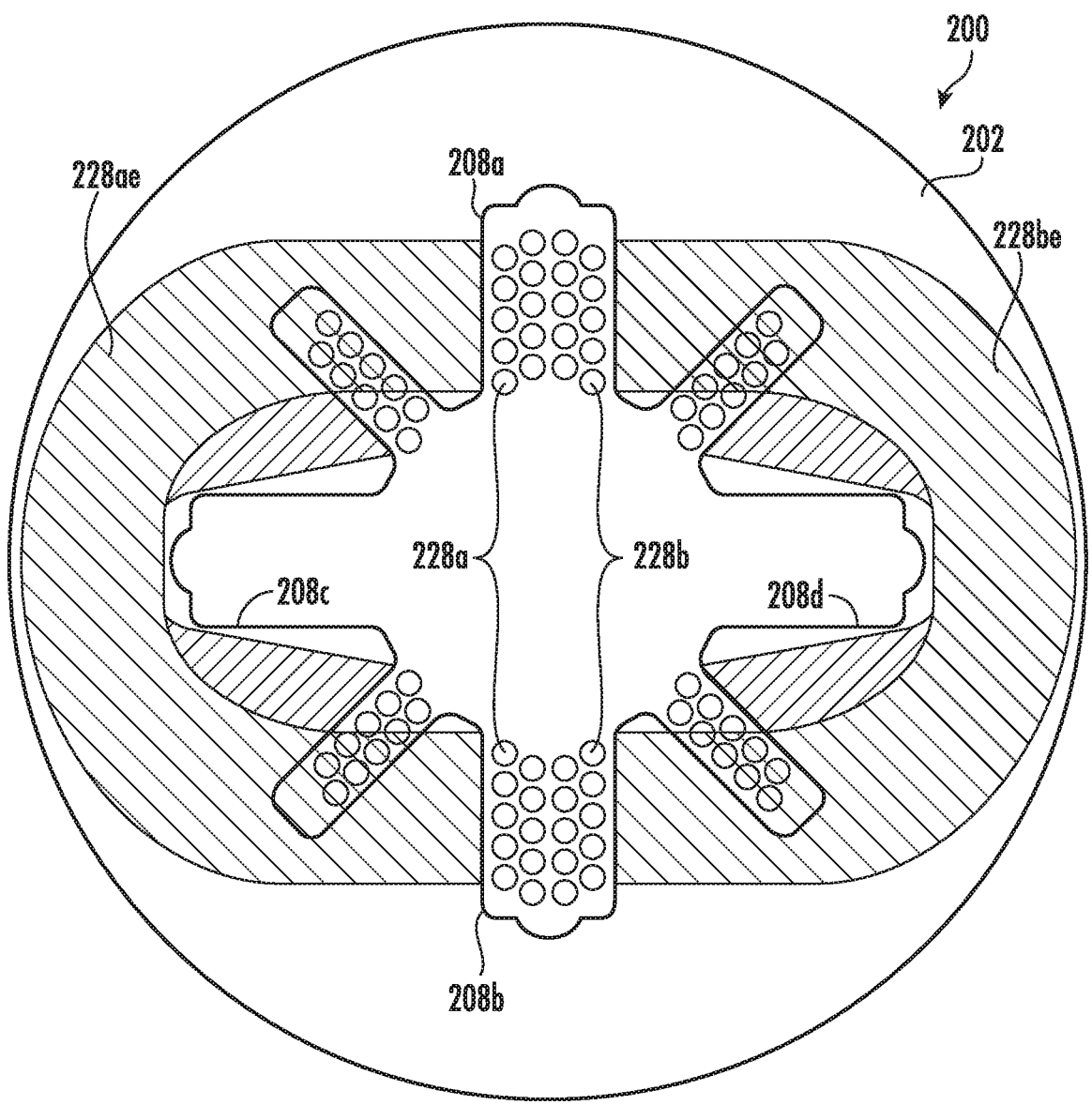
FIG. 18 is a top view of an embodiment of the present disclosure illustrating one manner in which a second, or additional cosine, coil windings may be inserted into the 8-slot stator with end turns on top of the first cosine coil windings inserted in accordance with FIG. 17.

In one or more embodiments, the coil configuration consists of four coils, each one wound with 23 turns of AWG #33.5 wire wound as shown in FIG. 18 of U.S. Pat. No. 9,530,559, the entirety of which is incorporated by reference. Thickness of each coil was 0.022 inches, providing an axial length of 0.044 inches dedicated to the end-turns on each end of the motor, allowing the motor to be quite compact and efficient. Pairs of coils were inserted into slots as described above and connected in series. With this coil configuration, the peak torque constant (KT) from each of the sine and cosine phase windings was 44,045 D*CM per amp, inductance was 190 microhenry, and coil resistance (R) was 3 ohms. Motor Constant is a figure of merit that communicates how well a motor produces torque compared to the amount of heat generated. Motor Constant is equivalent to the motor's Torque Constant (KT) divided by the square root of the motor's coil resistance (R). In the case of the embodiment described above, the Motor Constant is 25,429 D*CM at 1 watt, which is believed to be superior to any continuous rotation motor having such a low rotor inertia.

Cogging torque was found to be a maximum of 6,000 D*CM, which was acceptably low for optical scanning applications.

With a modest 8 amps applied to the coils, the angular acceleration was 12,584,286 radians/second$^2$, which exceeds that of both the conventional slotless brushless motor as well as the galvanometer-based optical scanner presented above. Other coil configurations are also possible.

When the motor was filled with a high quality thermally-conductive epoxy, thermal resistance was less than 1 degree C. per watt, resulting in a continuous RMS current capability of 4 amps.

Designers of brushless motors of the current state of the art may have overlooked the stator construction presented above, having four deep/wide slots, on the basis that motor designers endeavor to create a stator having a sinusoidal flux distribution, thus minimizing "stator harmonics". The four-slot arrangement of the present invention has a nearly squarewave-like flux distribution, and thus has very strong stator harmonics. Stator harmonics are undesirable because they contribute to operational acoustic noise as well as eddy currents in the magnet during continuous rotation. However, when the motor is made having relatively small dimensions, artifacts caused by the stator harmonics are acceptable for optical scanning applications and possibly other applications as well.

8-Slot Embodiment

Referring now to FIGS. 10-12b, one embodiment of the present disclosure comprises a small brushless motor 200. The motor includes a stator 202 defining an aperture 204 extending axially therein, wherein the aperture 204 is sized and shaped for receiving a rotor 106. In one embodiment, the aperture 204 defines four wide slots 208a-d and four narrow slots 209a-d, with eight contoured ends 210a-h between the slots. The four wide slots 208a-d defined by the stator may further define notches 212a-d, said notches defined by an absence of stator material at an end of a slot distal the aperture. As used herein, the terms "wide" and "narrow" are relative, and describe a width dimension of a slot relative to a width dimension of another slot within the same stator.

As depicted in FIGS. 10 and 25, an embodiment of a rotor 106 comprises a two-pole diametral-magnetized magnet 122 bidirectionally operable with the stator 202 (FIG. 10) and configured for extending into the aperture 204. A separation 224, such as an air-gap, is formed between an outer surface 126 of the rotor 106 and the contoured ends of the aperture 210a-h, between the slots 208a-d and 209a-d.

Figure 12A:
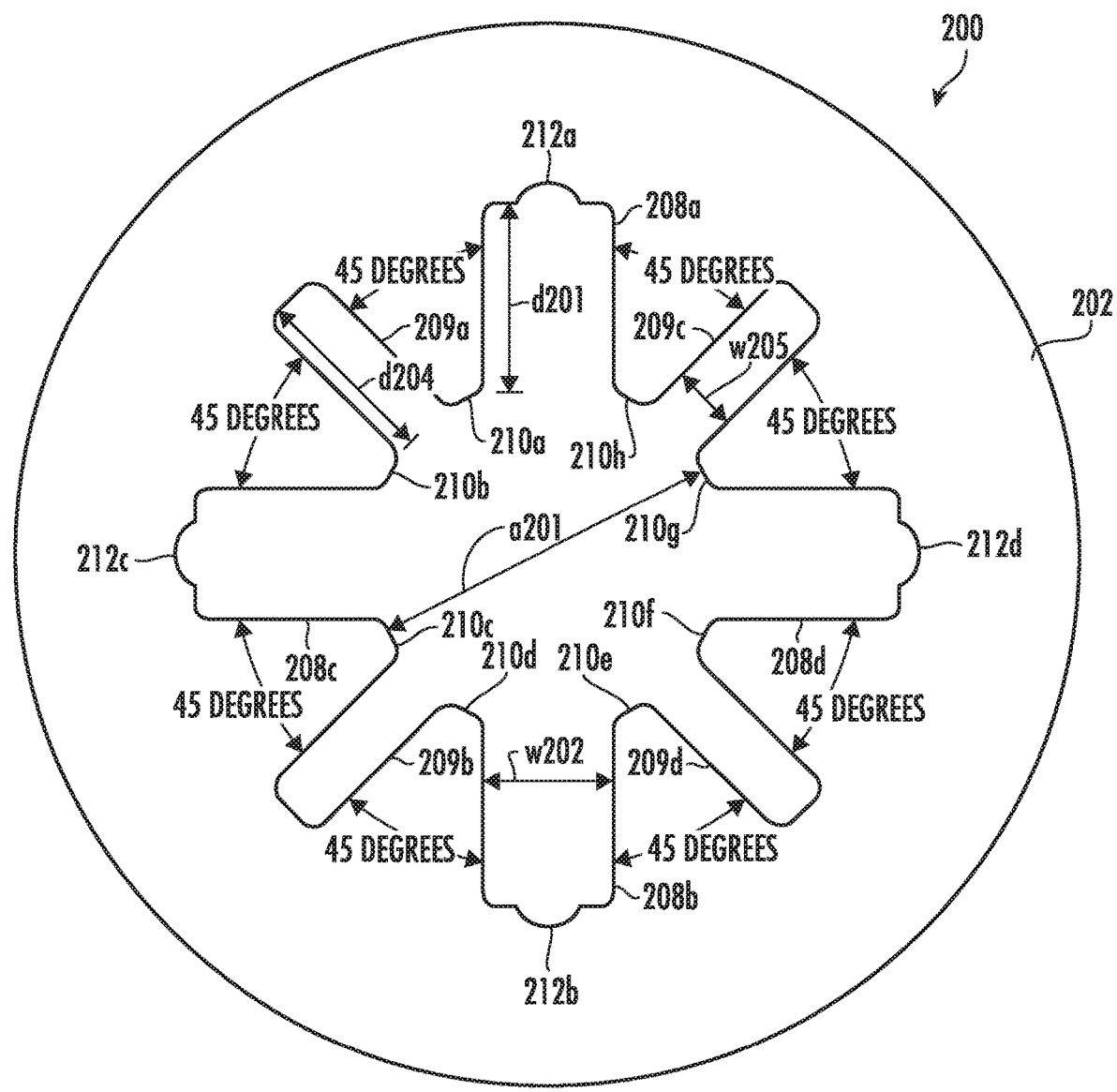
FIG. 12a is a top, cross-sectional view of an embodiment of the present disclosure, depicting an eight-slot stator and the angular and dimensional relationship between the slots.
Figure 23A:
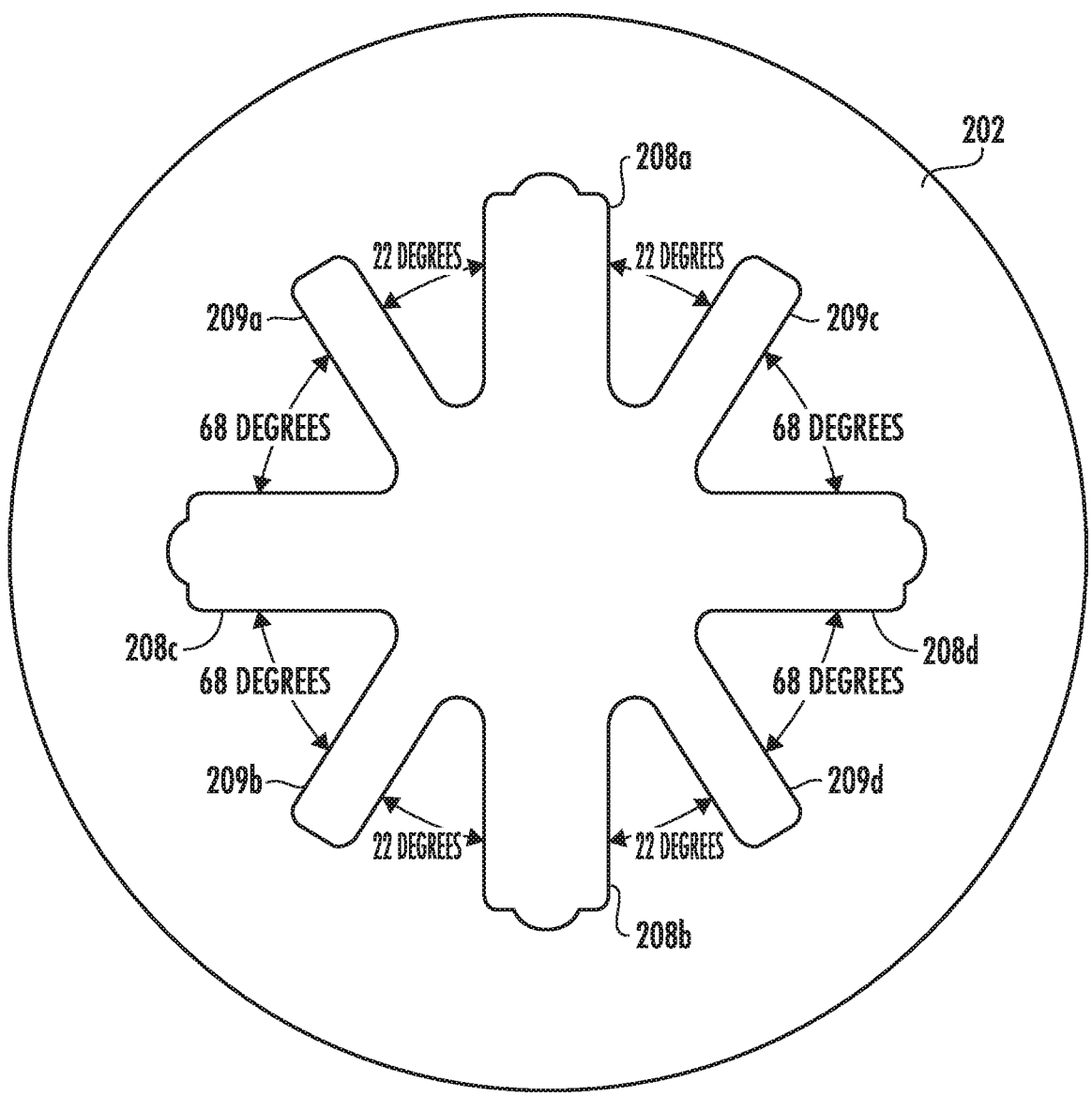
FIG. 23a is a top, cross-sectional view of an embodiment of the present disclosure, depicting an eight-slot stator and an alternative angular relationship between the slots.

Referring now to FIG. 12a, in one embodiment, the four wide slots 208a-d (first 208a, second 208b, third 208c, and fourth 208d slots) comprise diametrically-opposed pairs of slots, arranged orthogonally. Four narrower slots 209a-d (first 209a, second 209b, third 209c, and fourth 209d slots) are arranged at angles between the four wide slots 208a-d. The four narrower slots 209a-d may be evenly spaced at 45-degree angles with respect to the four wide slots 208a-d, or they may be arranged at different angles, as shown in FIG. 23a. For example, in one or more embodiments, an angle between a wide slot and a narrow slot is greater than or equal to about 45 degrees or less than or equal to about 45 degrees. Alternatively, in one or more embodiments, an angle between a wide slot and a narrow slot is about 68 degrees, and/or an angle between a wide slot and narrow slot is about 22 degrees. Other suitable angles between the slots, however, are considered to be within the scope of the present disclosure.

Figure 12B:
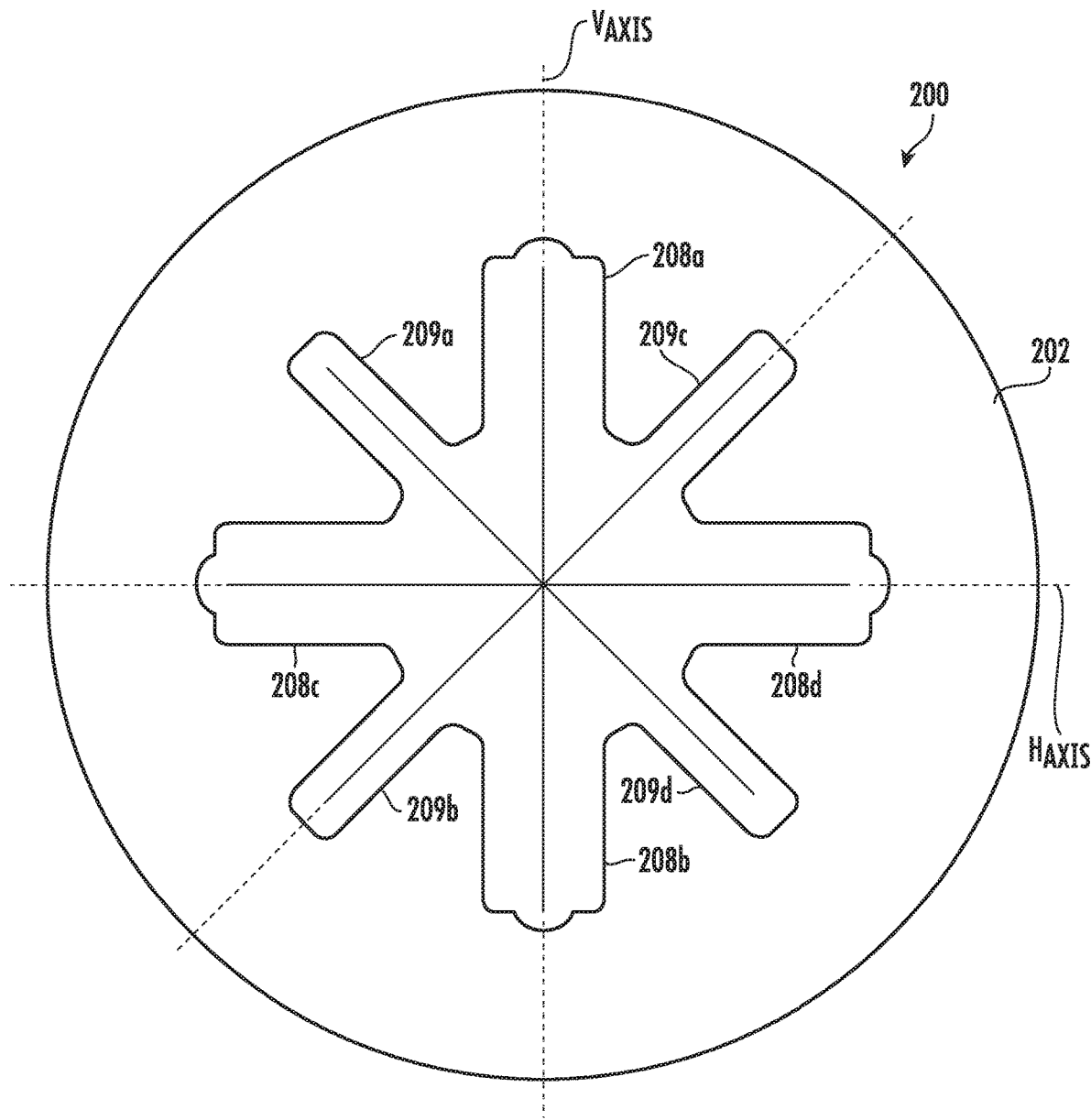
FIG. 12b is a top, cross-sectional view of an embodiment of the present disclosure, illustrating that the slot configuration shown in FIG. 12a is symmetrical about vertical and horizontal axes, and is also rotationally symmetric.
Figure 23B:
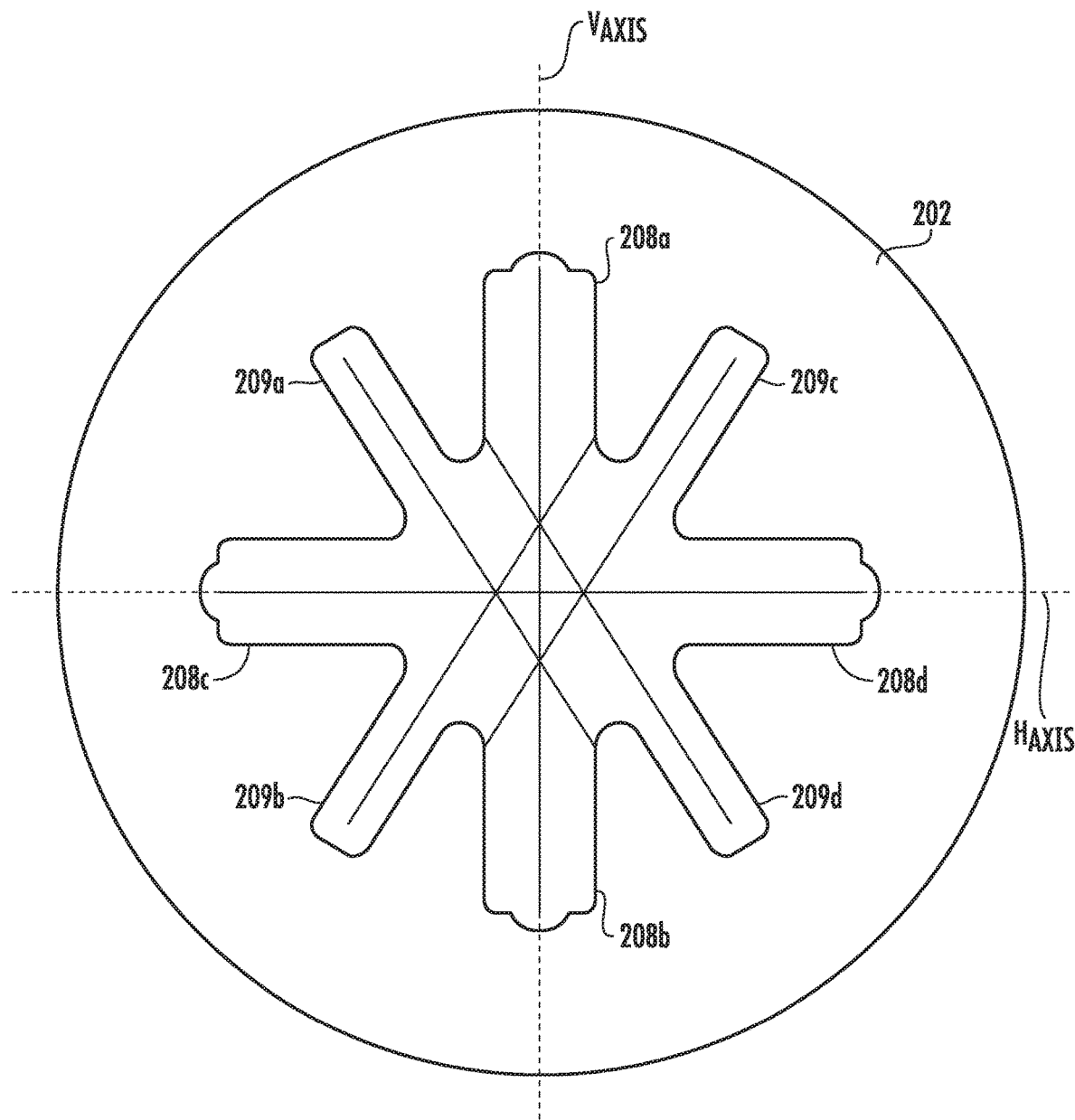
FIG. 23b is a top, cross-sectional view of an embodiment of the present disclosure, illustrating that the slot configuration shown in FIG. 23a is symmetrical about vertical and horizontal axes, but is not rotationally symmetric.

When the four narrower slots 209a-d are evenly spaced at 45-degree angles as shown in FIGS. 12a and 12b, the stator slot configuration can be demonstrated to be symmetrical about the horizontal axis ($h_{axis}$) and the vertical axis ($v_{axis}$), as well as being rotationally symmetrical. In one or more embodiments, rotating the slot configuration by 90 degrees will yield the same slot pattern. This is illustrated in FIG. 12b which places lines parallel to all slots that clearly intersect in the center. In one or more embodiments, when the four narrower slots 209a-d are arranged at angles other than 45-degrees, the stator slot configuration will be symmetrical about the horizontal and vertical axes, but will not be rotationally symmetrical. This is illustrated in FIG. 23b which places lines parallel to the narrower slots 209a-d that clearly do not intersect in the center.

The width dimension w202 of all wide slots 208a-d is typically made to be about the same for all wide slots, but this should not be construed as a limitation. Likewise the width dimension w205 of all narrow slots 209a-d is typically made to be about the same for all narrow slots, but this should not be construed as a limitation. Moreover, in one or more embodiments, the width dimension w202 of the wide slots is nearly, or about, double the width dimension w205 of the narrow slots, however this should not be viewed as a limitation, because the actual slot width is optimized to hold the coils 228a, 228b, 230a 230b, 232a, 232b, 234a, 234b that are inserted into the slots 208abcd, 209abcd. In one or more embodiments, the width of the wide slots is exactly double the width of the narrow slots. Alternatively, in one or more embodiments, the width of the wide slots is more than double the width of the narrow slots.

As depicted in FIG. 10, one of the pairs of wide slots may be oriented vertically, or along a first axis, (208a, 208b), and the other pair of wide slots may be oriented horizontally, or along a second axis, (208c, 208d). The wide slots 208a-d as well as narrow slots 209a-d define areas where electrical coils 228, 230 may be inserted.

In order to fit electrical coils 228, 230, 232, 234 into the slots 208a-d and 209a-d, and also have a desirable conductor packing density, the coils 228, 230, 232, 234 are externally preformed and preferably made as described in U.S. Pat. No. 9,530,559, the entirety of which is incorporated by reference. Specifically, the coils 228, 230, 232, 234 used in connection with embodiments of the present disclosure are best formed such that they generally define a "racetrack" shape as shown in FIG. 7 of the '559 patent. Other suitable coil configurations, however, are within the scope of the present disclosure, including coils that use rectangular wire.

Figure 13:
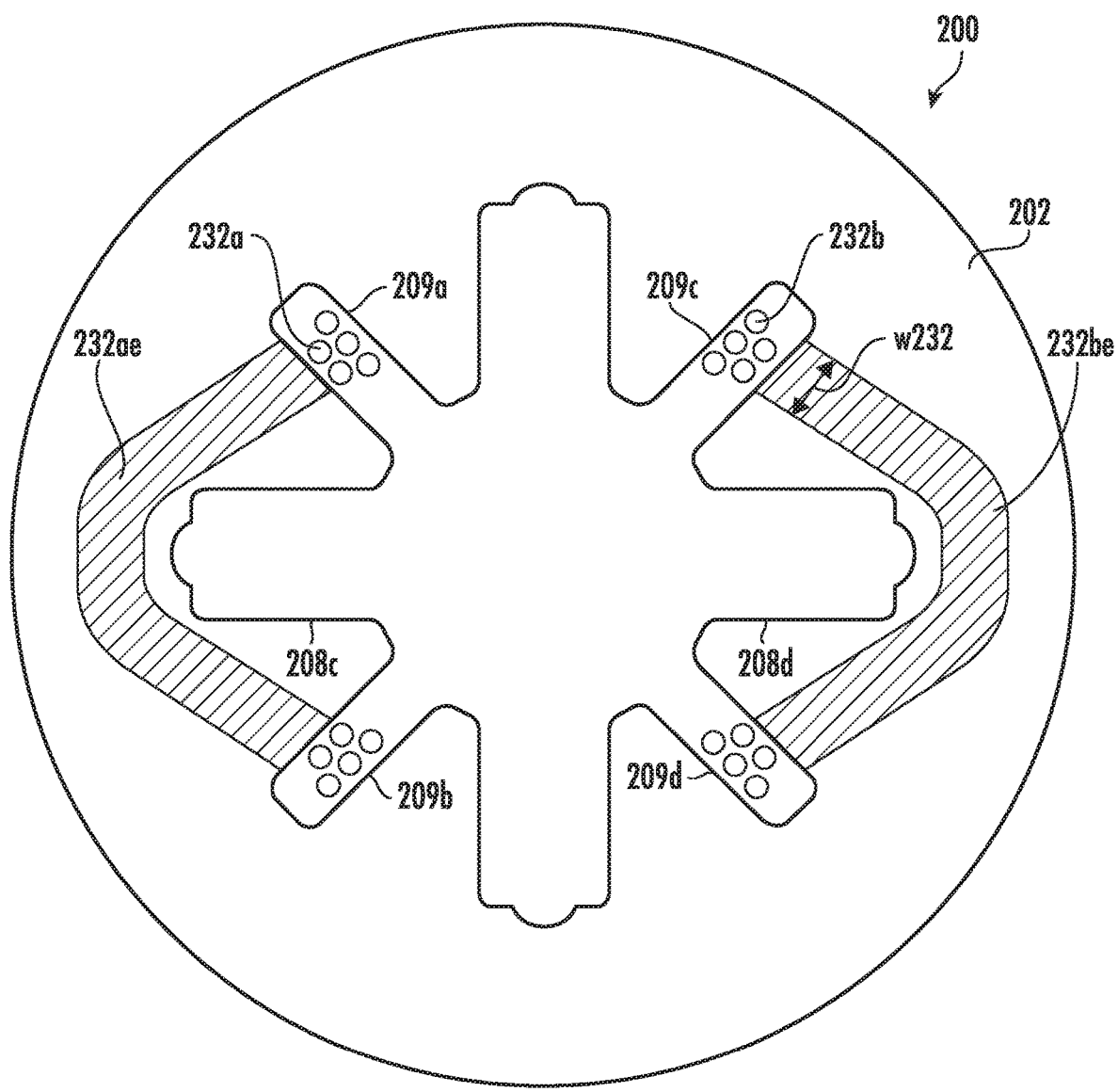
FIG. 13 is a top view of an embodiment of the present disclosure illustrating one manner in which the first, or cosine, coil windings may be inserted into an 8-slot stator.
Figure 14:
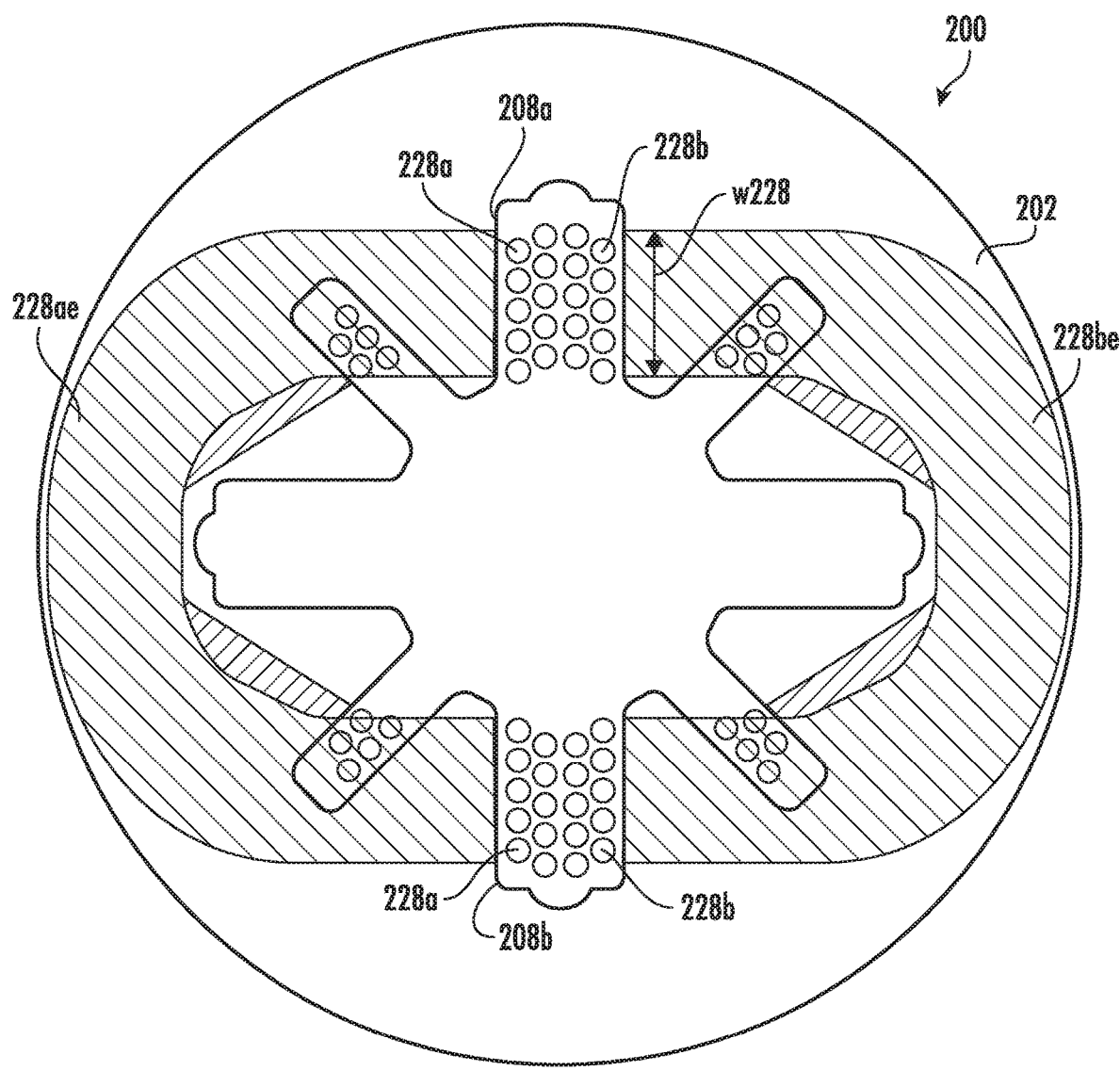
FIG. 14 is a top view of an embodiment of the present disclosure illustrating one manner in which a second, or additional cosine, coil windings may be inserted into an 8-slot stator with end turns on top of the first cosine coil windings.

In one embodiment, each of the wide slots 208a-d is sized such that the depth dimension d201 of the slot is greater than a width dimension w228 of a coil 228, 230 (see FIG. 14). Likewise, a width dimension of each wide slot w202 may be greater than a thickness dimension t1 of the pair of coils. Likewise, each of the narrow slots 109a-d is sized such that the depth dimension d204 of the slot is greater than the combined width dimensions (w232+w234) of coils 232 and 234 (see FIG. 13 and FIG. 15), or simply greater than the width dimension w232 of coil 232, if coil 234 is not used (see FIG. 17). Likewise, a width dimension of each narrow slot w205 may be greater than a thickness dimension t1 of the coils inserted into the narrow slots 109a-d. Note that the depth dimension of the wide slots 208a-d and narrow slots 209a-d may be different from each other.

The continuity and consistency of the torque produced over the 360-degree range of rotation depends on how the coils are inserted into the 8-slot stator 202. When it is desired for torque to be produced evenly over the 360-degree range of rotation, then the same number of turns of coil wire must be used for both sine and cosine windings. However, when a greater amount of torque is desired over a portion of the 360-degree range of rotation, then the sine or cosine windings may have a different number of turns. One of ordinary skill in the art having the benefit of the present disclosure will appreciate how varying the number of turns can be used to provide a motor having a variable torque over predefined angular ranges.

It will now be discussed how to assemble one or more embodiments of the brushless motor 200 to produce consistent torque over the 360-degree range of rotation. During assembly of an embodiment described herein, and as depicted in FIGS. 13-16, a first electrical coil 232a is inserted into the distal end of the left/diagonal pair of narrow slots 209a, 209b. A second electrical coil 232b is inserted into the distal end of the right/diagonal pair of narrow slots 209c, 209d. End turns 232ae, 232be are folded over in such a way that they do not occlude the horizontally-oriented slot pair 208c, 208d. This coil configuration is depicted in FIG. 13.

Next, a third electrical coil 228a, and fourth electrical coil 228b are both inserted into the vertically-oriented slot pair 208a, 208b, and the end turns 228ae, 228be are folded over in such a way that these end-turns do not occlude the horizontally-oriented slot pair 208c, 208d. This coil configuration is depicted in FIG. 14. (Coils 208a, 208b, 228a, 228b are referred to as "cosine coils" in this example.) Note that this assembly method provides an unimpeded insertion of additional coils 228a, 228b into the horizontally-oriented slot pair 108c, 108d, and also provides unimpeded insertion of additional coils 234a, 234b into the remaining areas of diagonally-oriented slots 209a, 209b, 209c, 209d.

Next a fifth electrical coil 234a is inserted into the proximal end of the upper/diagonal pair of narrow slots 209a, 209c. A sixth electrical coil 234b is inserted into the proximal end of the lower/diagonal pair of narrow slots 209b, 209d. End turns 234ae, 234be are folded over in such a way that they do not occlude the aperture 204. This coil configuration is depicted in FIG. 15.

Figure 16:
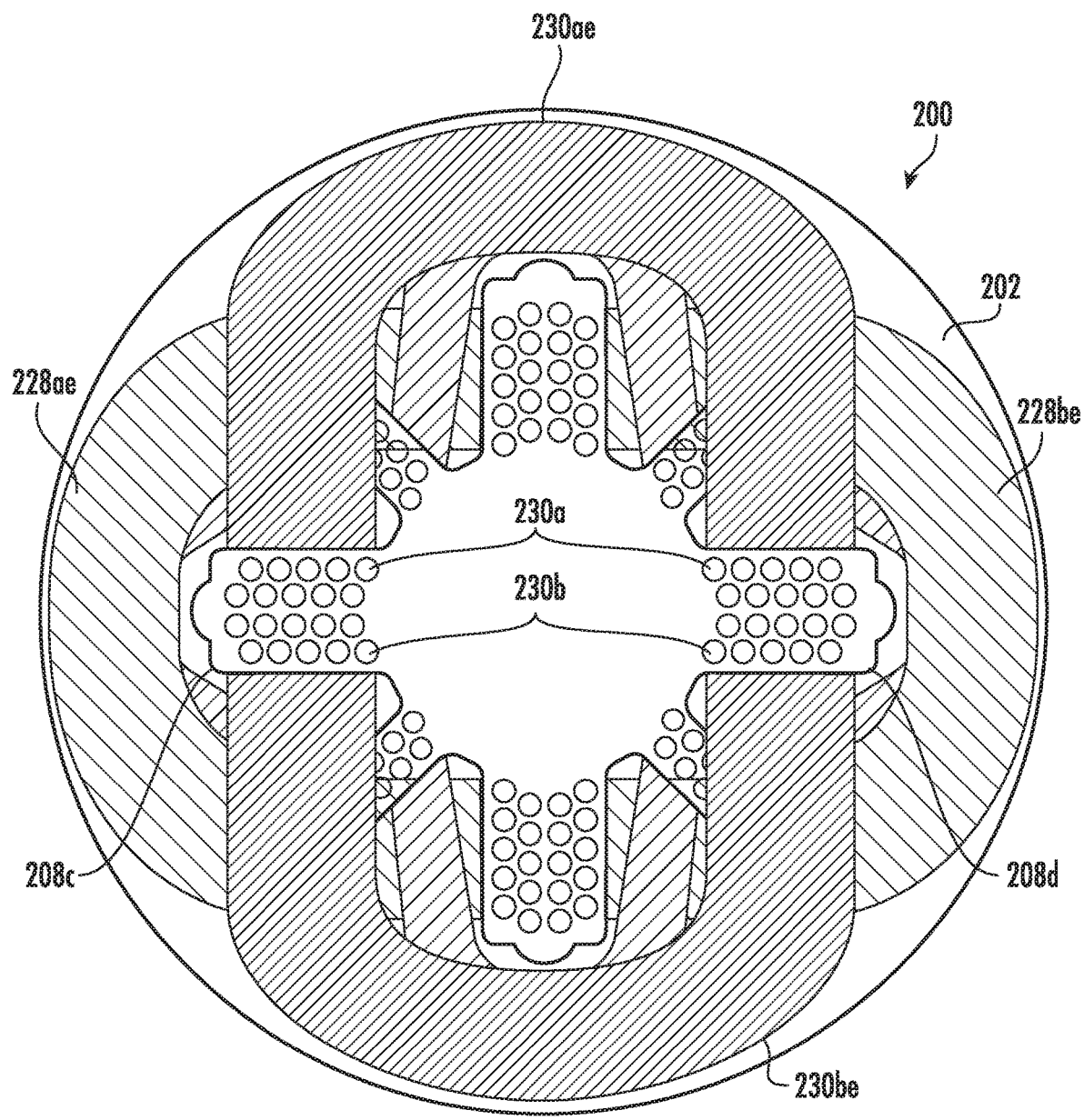
FIG. 16 is a top view of an embodiment of the present disclosure illustrating one manner in which a fourth, or additional sine, coil windings may be inserted with end turns on top of the first and second cosine coil windings as well as the first sine windings.

Next, a seventh electrical coil 230a, and eighth electrical coil 230b are both inserted into the horizontally-oriented slot pair 208c, 208d, and the end turns 228ae, 228be are folded over in such a way that these end-turns do not occlude the aperture 204. This coil configuration is depicted in FIG. 16. (Coils 234a, 234b, 230a, 230b are referred to as "sine coils" in this example.) Note that the end-turns for the sine coils are folded over such that they are essentially on top of the end-turns of the cosine coils, as shown in FIG. 16. Once both the cosine-coil and sine-coil are inserted and end-turns folded over, the aperture 204 is unobstructed, and can receive the rotor 120 of the present disclosure.

Figure 15:
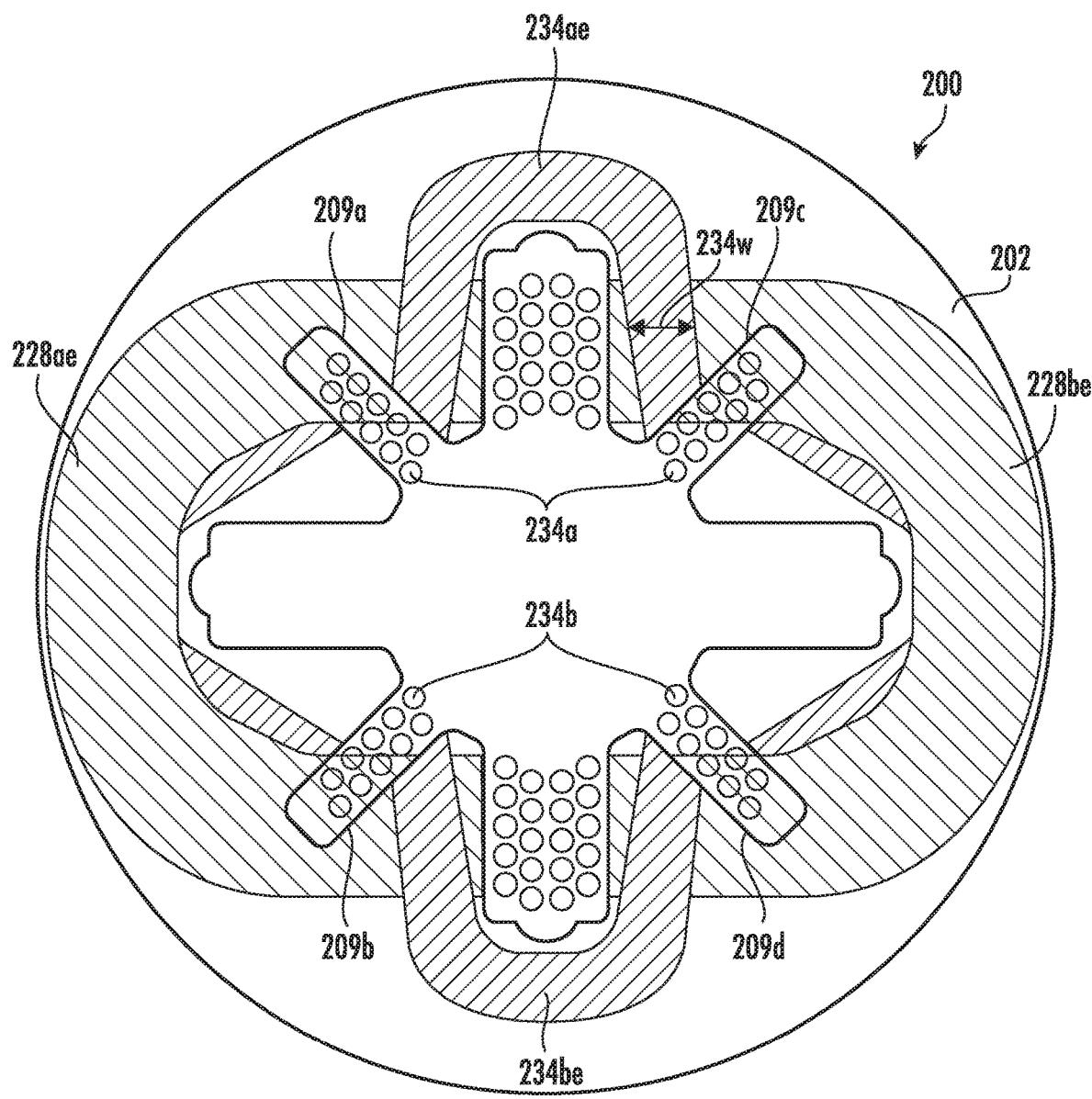
FIG. 15 is a top view of an embodiment of the present disclosure illustrating one manner in which a third, or sine, coil windings may be inserted into an 8-slot stator, with end turns on top of the first and second cosine coil windings.

Note that in one or more of the exemplary embodiments disclosed herein the cosine coils 232a, 232b that are inserted into the narrow slots 209a-d as well as the sine coils 234a, 234b that are inserted in the narrow slots 209a-d are depicted in FIG. 13 and FIG. 15 as each having 5 turns of wire. Also note that the cosine coils 228a, 228b that are inserted into the wide slots 208a-d as well as the sine coils 230a, 230b are depicted in FIG. 14 and FIG. 16 as each having 10 turns of wire. If the cosine coils 232a, 232b, 228a, 228b are connected in series, there is a total of 30 turns for the overall cosine winding. Likewise, if the sine coils 234a, 234b, 230a, 230b are connected in series, there is a total of 30 turns for the overall sine winding. Because of this, torque produced by the motor by both the sine coil and cosine coil will be the same, and thus the brushless motor 200 will be able to produce consistent torque throughout the 360-degree range of rotation.

Figure 17:
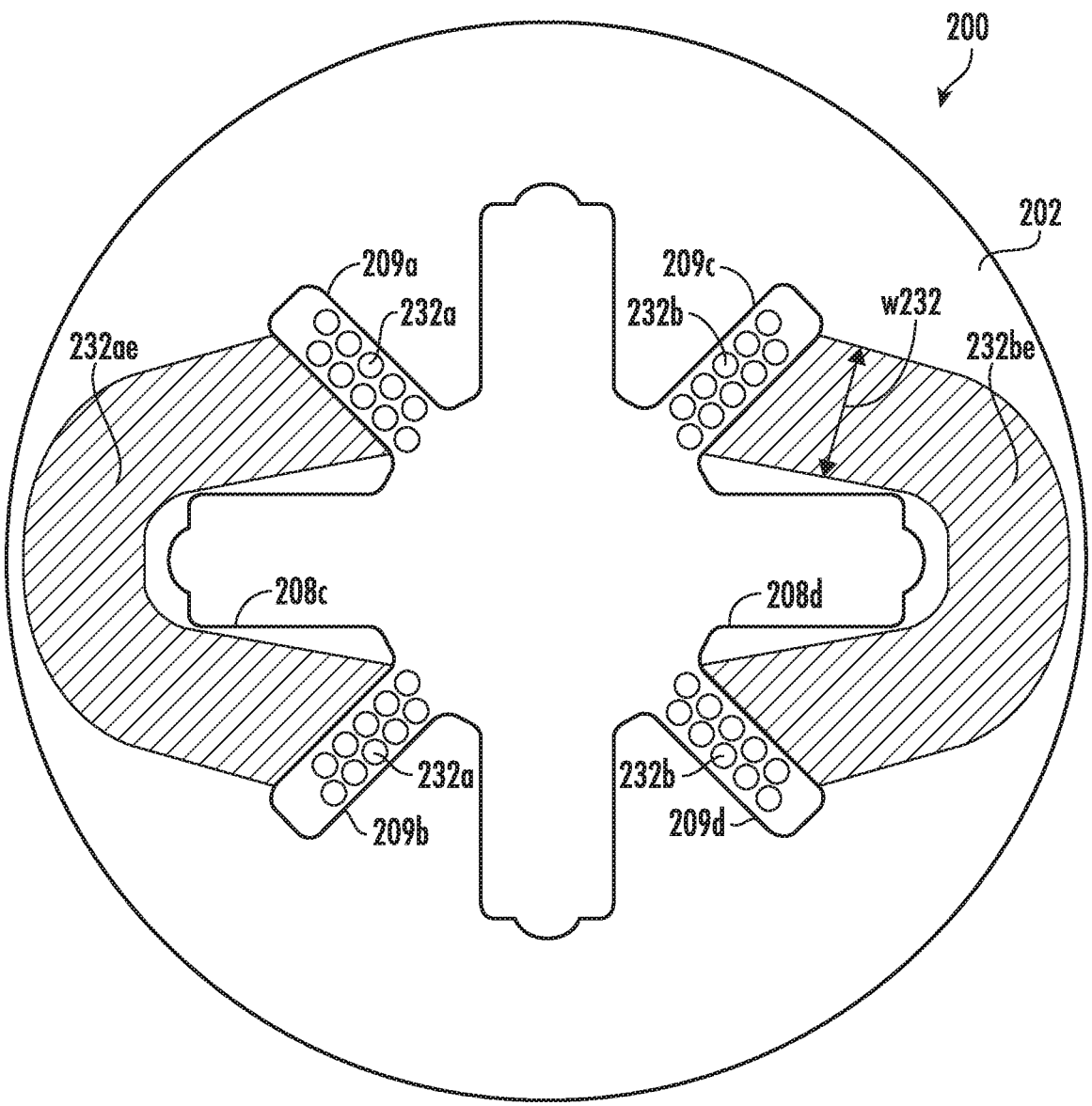
FIG. 17 is a top view of an embodiment of the present disclosure illustrating one manner in which a first, or cosine, coil windings may be inserted into an 8-slot stator. Which may be used when greater torque is desired for cosine range of angles than sine range of angles.

As an alternative to producing consistent torque over the 360-degree range of rotation, the coils may be configured and inserted into the stator 202 in such a way that a greater amount of torque is available over certain angles. As a non-limiting example, this may be desired for specialized optical scanning applications which exercise the motor more vigorously over a restricted range of angles, but still desire continuous rotation capability. The assembly process for such a configuration is depicted in FIGS. 17-21. A first electrical coil 232a is inserted into the left/diagonal pair of narrow slots 209a, 209b. A second electrical coil 232b is inserted into the right/diagonal pair of narrow slots 209c, 209d. End turns 232ae, 232be are folded over in such a way that they do not occlude the horizontally-oriented slot pair 208c, 208d. This coil configuration is depicted in FIG. 17.

Figure 19:
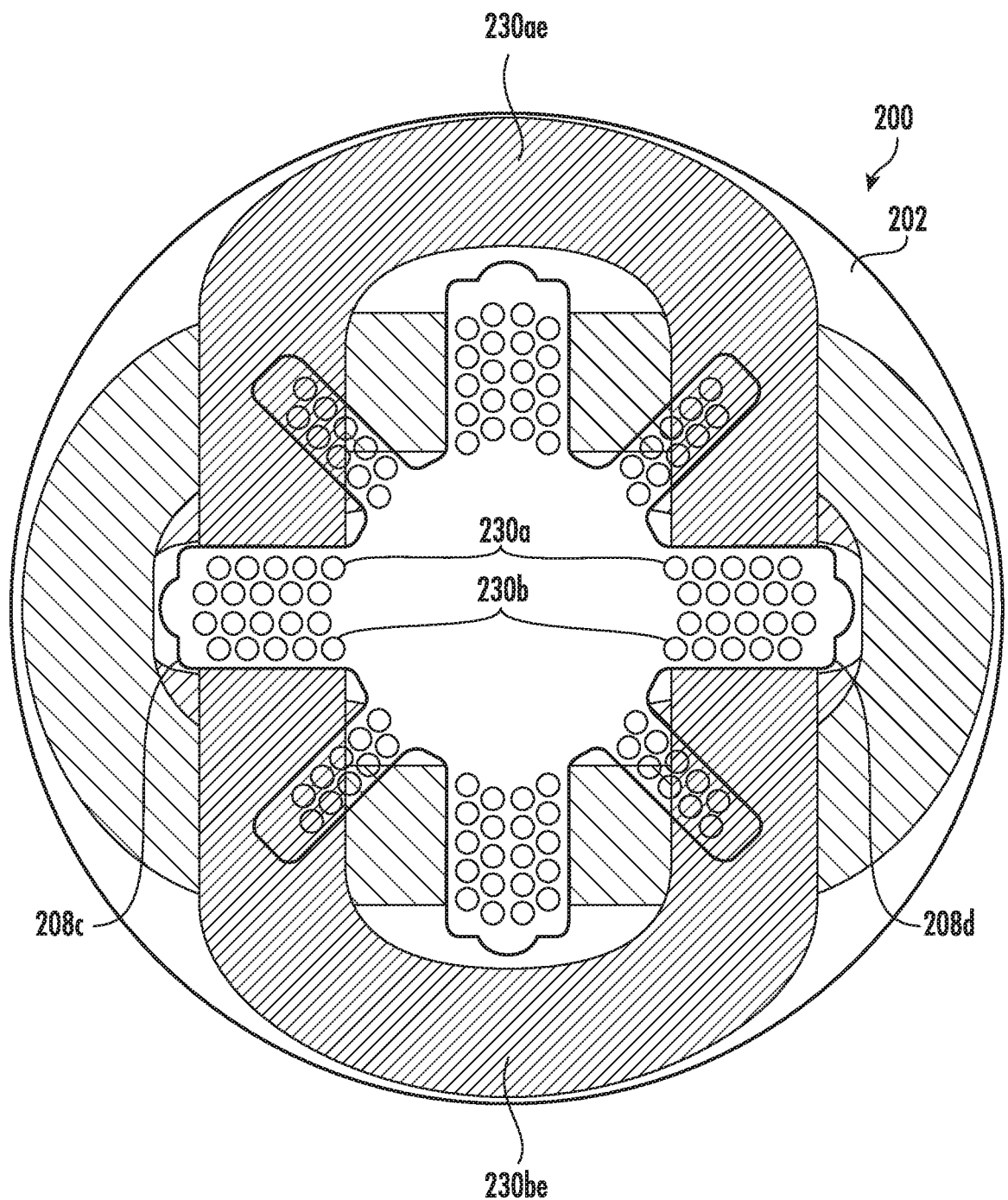
FIG. 19 is a top view of an embodiment of the present disclosure illustrating one manner in which a third, or sine, coil windings may be inserted into an 8-slot stator, with end turns on top of the first and second cosine coil windings, when cosine windings are inserted in accordance with FIG. 17 and FIG. 18.

Next, a third electrical coil 228a, and fourth electrical coil 228b are both inserted into the vertically-oriented slot pair 208a, 208b, and the end turns 228ae, 228be are folded over in such a way that these end-turns do not occlude the horizontally-oriented slot pair 208c, 208d. This coil configuration is depicted in FIG. 19. (These four coils 208a, 208b, 228a, 228b are referred to as "cosine coils" in this example.) Note that this assembly method provides an unimpeded insertion of additional coils 228a, 228b into the horizontally-oriented slot pair 108c, 108d.

Next, a fifth electrical coil 230a, and sixth electrical coil 230b are both inserted into the horizontally-oriented slot pair 208c, 208d, and the end turns 228ae, 228be are folded over in such a way that these end-turns do not occlude the aperture 204. This coil configuration is depicted in FIG. 19. (These two coils 230a, 230b are referred to as "sine coils" in this example.) Note that the end-turns for the sine coils are folded over such that they are essentially on top of the end-turns of the cosine coils, as shown in FIG. 19. Once both the cosine-coil and sine-coil are inserted and end-turns folded over, the aperture 204 is unobstructed, and can receive the rotor 120 of the present disclosure.

Note that the cosine coils 232a, 232b that are inserted into the narrow slots 209a-d are depicted in FIG. 17 as each having 10 turns of wire. Also note that the cosine coils 228a, 228b that are inserted into the wide slots 208a-d as well as the sine coils 230a, 230b are depicted in FIG. 18 and FIG. 19 as each having 10 turns of wire. If the cosine coils 232a, 232b, 228a, 228b are connected in series, there is a total of 40 turns for the overall cosine winding. However, if the sine coils 230a, 230b are connected in series, there is only a total of 20 turns for the overall sine winding. Because of this, torque produced by the motor will be stronger over the range of angles driven by the cosine coils as opposed to the range of angles driven by the sine coils. Thus the brushless motor 200 will not produce consistent torque throughout the 360-degree range of rotation. The number of turns on each coil presented herein are only stated for the purposes of providing a non-limiting example.

For applications described herein, where it is desired that the torque be greater over certain angles of the 360 degree range of rotation, performance and ease of assembly can both be improved by using the modified stator slot angular geometry illustrated in FIGS. 23a and 23b. Here, the angle of the narrow slots 209a-d are all biased toward the slot pair 208a, 208b. This makes the insertion of coils 232a and 232b easier, and also makes the folding of end-turns 232ae and 232be less stressful on the coils. Motor torque production is improved when the flux lines of the magnet (shown in FIG. 11) are more parallel to the narrow slots 209a-d.

Figure 20:
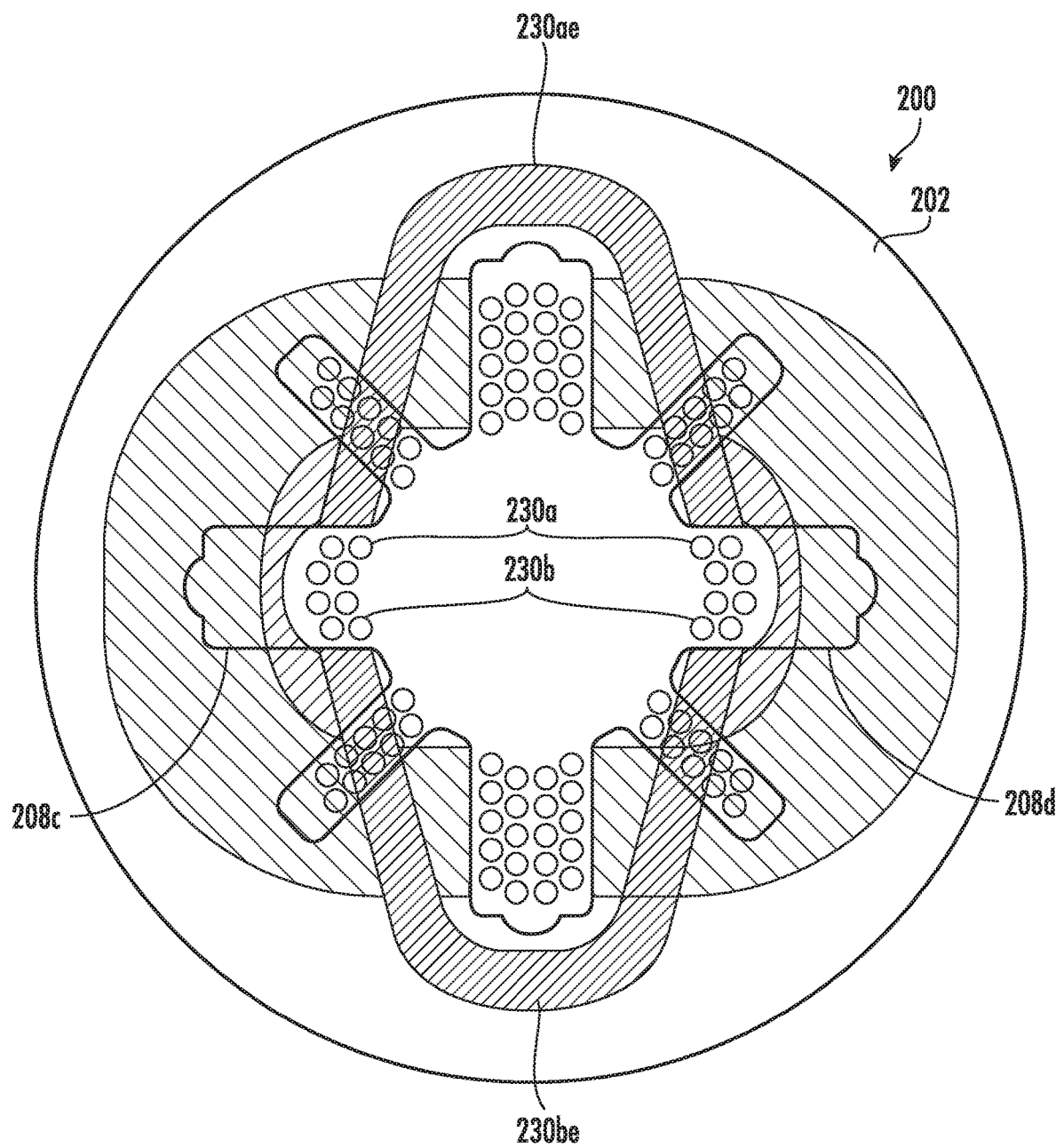
FIG. 20 is a top view of an embodiment of the present disclosure illustrating one manner in which a third, or sine, coil windings may be inserted into an 8-slot stator, with end turns on top of the first and second cosine coil windings, which may be used when greater torque is desired for cosine range of angles than sine range of angles; and wherein only small amounts of torque are required for the sine range of angles.
Figure 21:
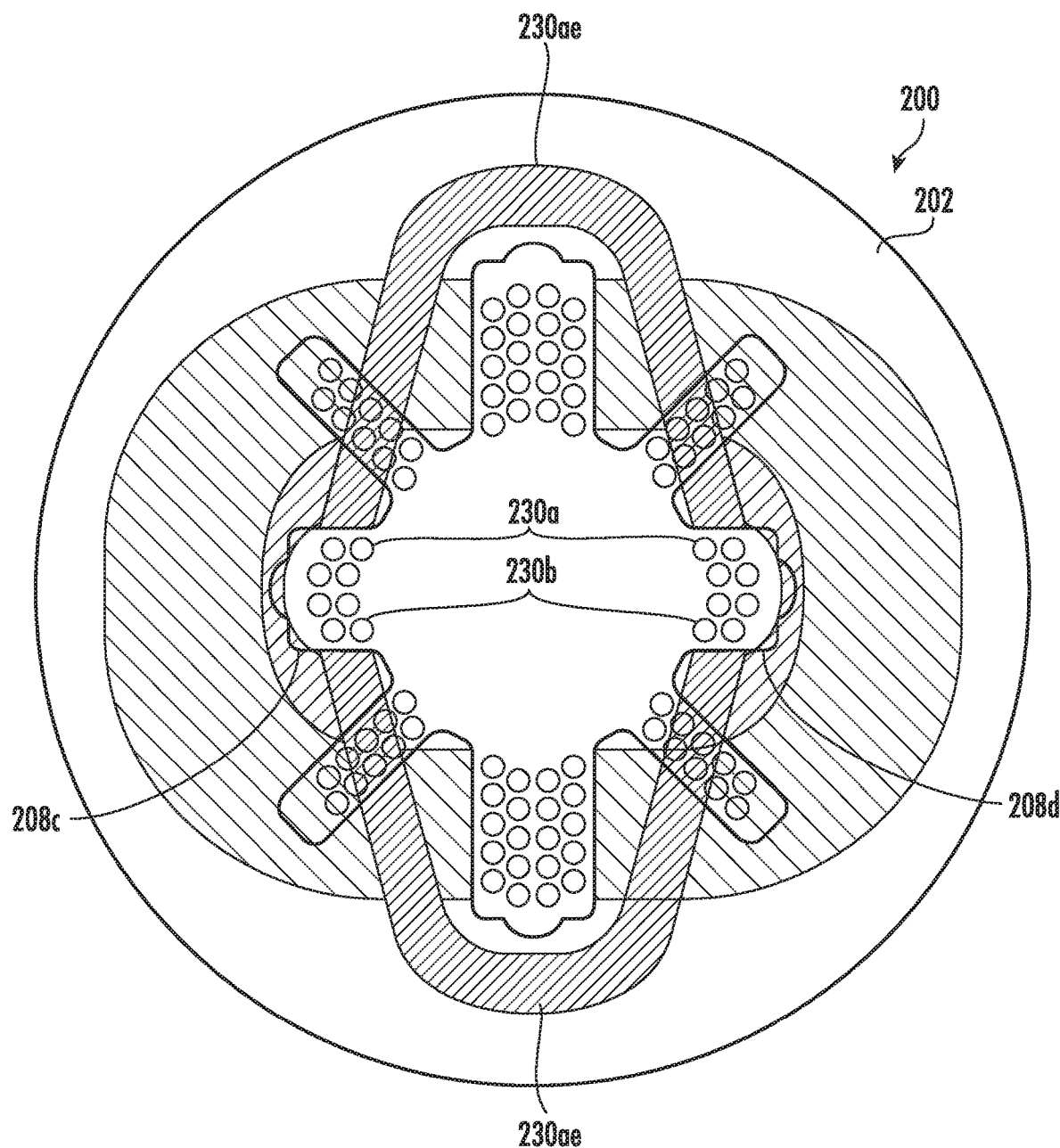
FIG. 21 is similar to the embodiment of FIG. 20, but wherein the depth of the slots allocated for sine-related torque production is reduced.

It is noteworthy that the number of turns provided to the sine coils 230a, 230b could be reduced further, if the application allows it. This is illustrated in FIG. 20, where the number of turns on each sine coil is reduced to just 4 turns for each coil. When this is done, the end turns 232ae, 232be, 228ae, 228be of the cosine coils 232a, 232b, 228a, 228b can be reduced in length.

Figure 22:
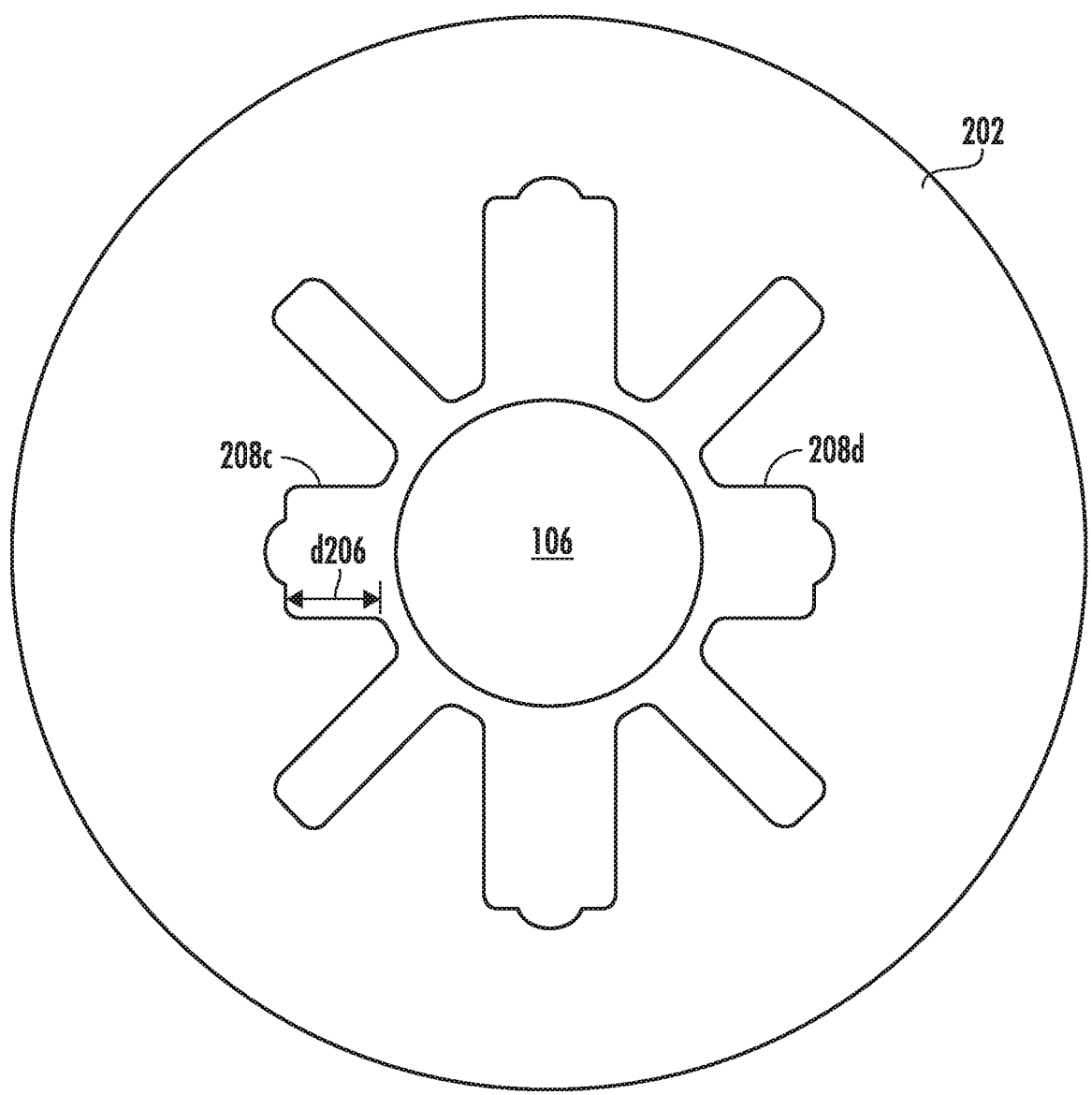
FIG. 22 is a top, cross-sectional view of an embodiment of the present disclosure, depicting an eight-slot stator, further identifying a depth dimension of two of the slots illustrated in FIG. 21.

FIG. 20 illustrates sine coils 230a, 230b having relatively few turns, and not descending into the entire depth of the slot pair 208c, 208d. While the brushless motor 200 will certainly work in this configuration, the depth d206 of the slot pair 208c, 208d, can be reduced, which may provide a better thermally-conductive path for the sine coils 230a, 230b. This is further illustrated in FIG. 22, which depicts an embodiment wherein a depth dimension of one pair of wide slots varies from (i.e. is greater than or less than) a depth dimension of a second pair of wide slots. As will be appreciated by one of ordinary skill in the art having the benefit of the present disclosure, the depth dimensions of the various slots may be altered to achieve the desired result without departing from the scope of the present disclosure.

Figure 24:
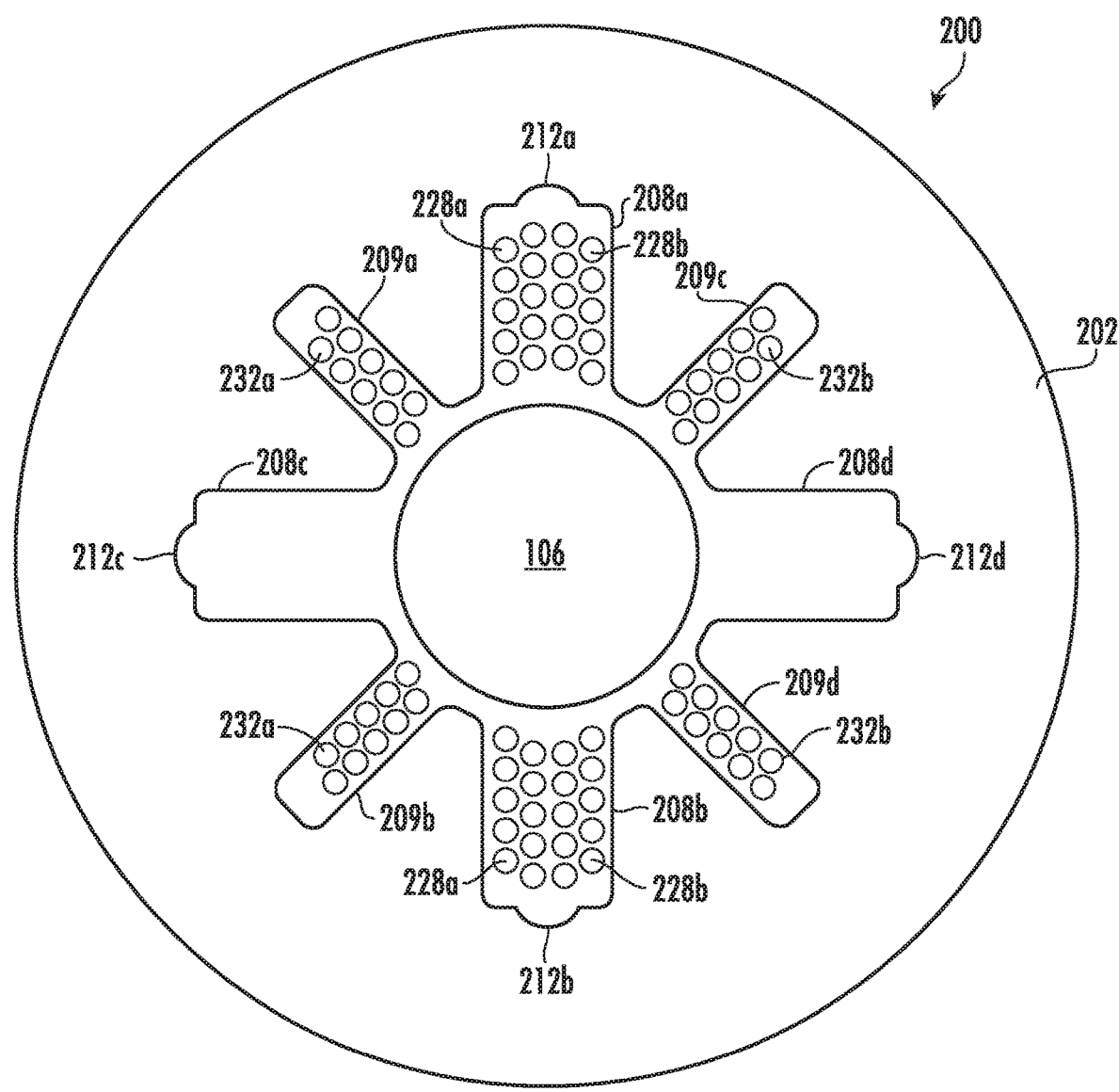
FIG. 24 is a top, cross-sectional view of an embodiment of the present disclosure, depicting an eight-slot stator, rotor, and coil windings inserted when exclusively cosine-torque is desired.

FIG. 24 shows an embodiment where no coils are inserted into slot pair 208c, 208d. In this configuration, the motor will only produce torque over the range of angles driven by the cosine coils, and end turns 232ae, 232be, 228ae, 228be of the cosine coils 232a, 232b, 228a, 228b could be reduced to a point where they completely occlude the slot pair 208c, 208d.

The coil(s) may comprise magnet wire, which is typically copper wire having an electrically insulating varnish over top. The insulating varnish prevents the turns of the coil from shorting out against other turns of the coil, and also prevents turns of the coil from shorting out against the stator material, which is electrically conductive.

The electrical coils 228, 230, 232, 234 may be excitable for providing bidirectional torque to the rotor 106. Notably, energizing a single coil will not provide continuous rotation. Energizing the cosine coil alone will cause the north/south pole orientation of the rotor magnet to become aligned orthogonal to that coil, after which no further rotation takes place. Fortunately, once the rotor is in that position, energizing the sine coil will cause the rotor magnet to rotate in a direction orthogonal to the sine coil and parallel to the cosine coil. Thus, each individual coil produces torque over only a limited range of angles, and the actual rotor magnet direction and torque depends on the current flowing through the coils and how that current is coordinated. Continuous rotation requires the coils to be energized sequentially in a sine/cosine drive fashion.

Figure 26:
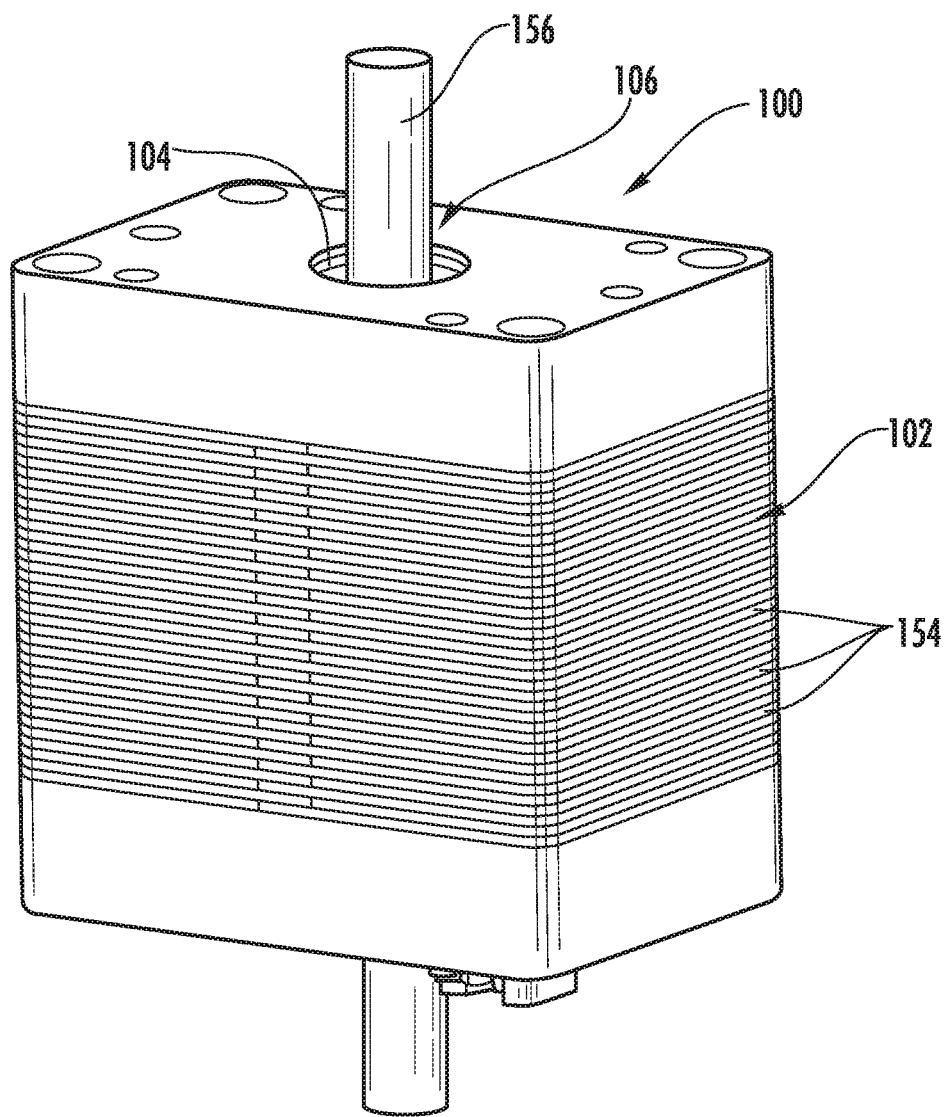
FIG. 26 is a perspective view of an embodiment of the present disclosure, depicting multiple stator laminations and a rotor.
Figure 27:
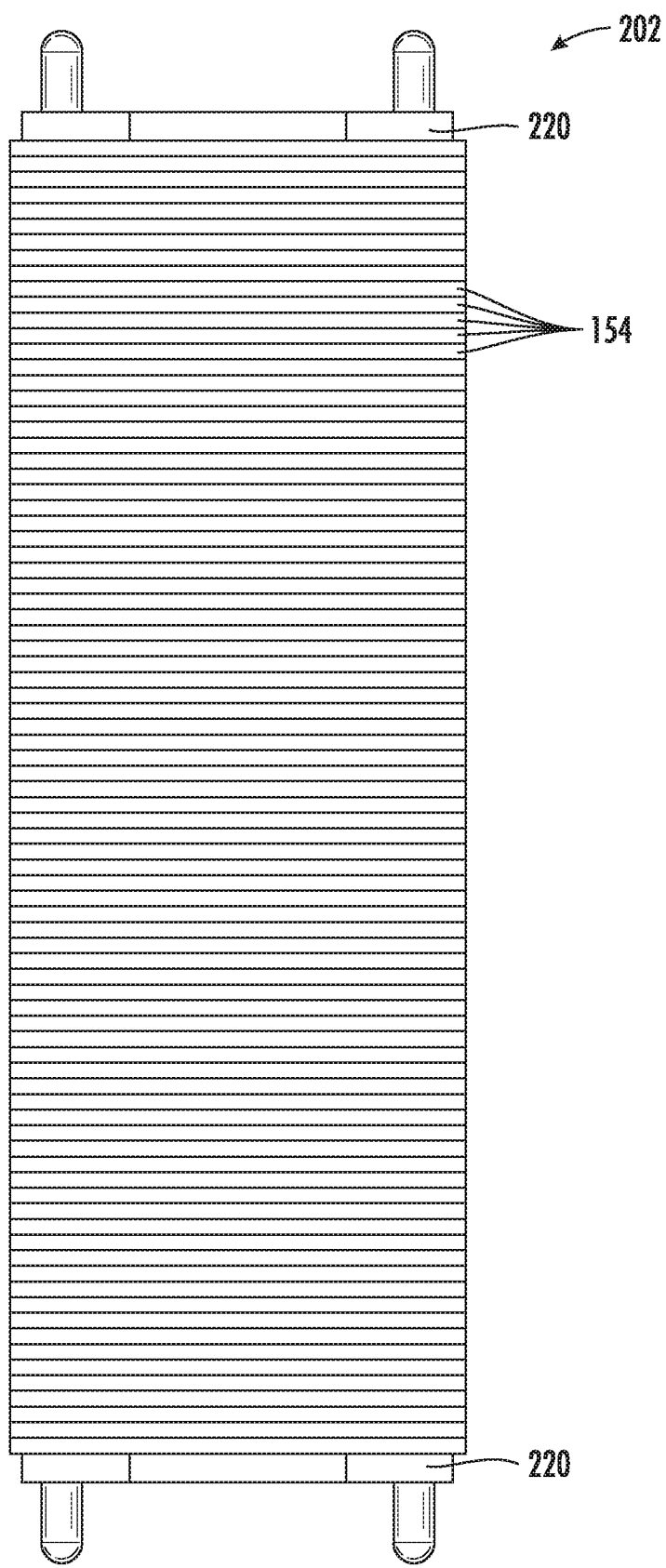
FIG. 27 is a side view of an embodiment of the present disclosure, depicting multiple stator laminations and "slot guards" at the top and bottom thereof.
Figure 28:
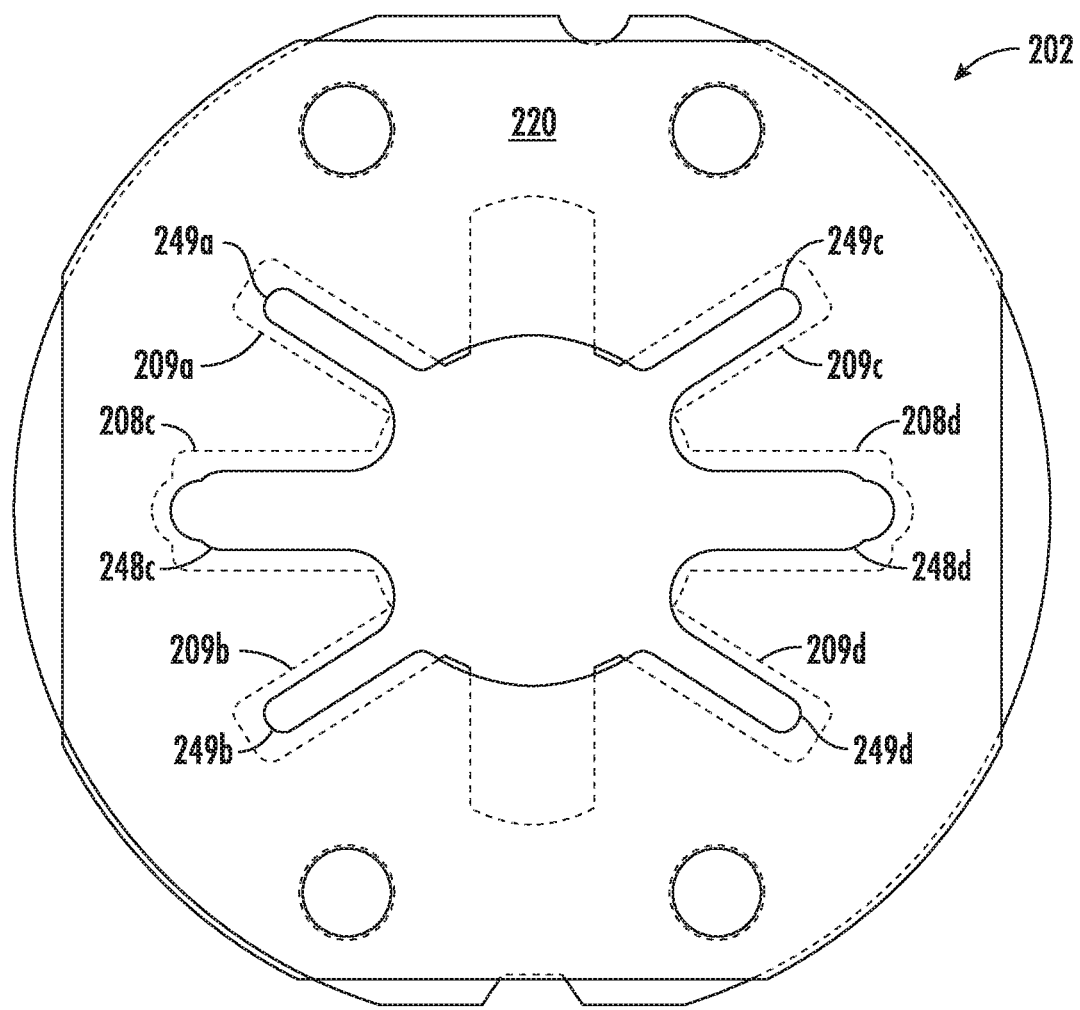
FIG. 28 is a top view of an embodiment of the present disclosure, depicting a "slot guard" on top of stator laminations.

As depicted in FIG. 26, the stator 202 may comprise multiple, thin, sheets of metal, herein referred to as laminations 154. The laminations 154 may be assembled to form a desired exterior and interior shape. The shape of each lamination 154 may be created by metal stamping, laser cutting, photo-etching, water-jet cutting, or other known methods of forming a shape from sheet metal. The laminations 154 may be made from a silicon-steel material known as M-19, a material specially made for motors and electrical transformers. However, many different materials will work, as long as the material is magnetically conductive. A few possible alternative materials include a cold-rolled steel (such as Q-195) and magnetic stainless steel (such as stainless steel 416).

In one embodiment, the stator 202, which is illustrated in cross section in FIG. 10, comprises a cylindrical outer shape. It will be understood by those skilled in the art, having the benefit of the teachings of the present disclosure, that alternative shapes may be employed in connection with embodiments of the present disclosure, such as, for example, the rectangular cross section shape of the motor 100A shown in FIG. 26, without departing from the teachings of the present disclosure.

In one embodiment, the outer dimensions of the stator 202 are sized such that there is enough magnetic material between the deep, or distal, end of each slot and the outside of the stator, such that the stator material is sufficient to conduct the magnetic flux. The outside diameter of the stator may also provide sufficient room so that when the end-turns are folded over, they do not exceed the outside diameter of the stator steel. This generally means that the distance between the outside diameter of the stator and the slot should be at least as great as the depth dimension of a slot.

To increase efficiency further, the slots can be made deeper so that more turns of electrical coil can fit within the slots. As described above, this will generally require that the outside diameter of the stator also be increased proportionally. As the slots become deeper, the end-turns of each electrical coil must become longer. At a certain dimension, the length of the end-turns will exceed the length of the conductors that are within the stator slots. Since the end-turns do not contribute to torque, but do contribute to weight, electrical resistance, heat (due to current flowing through the end turns, which have electrical resistance), and electrical inductance, it therefore follows that in order to maximize motor efficiency, it is desirable to maximize the height of the stator and minimize the length of the end-turns within practical limits.

In one or more embodiments, the rotor magnet 122 (see FIG. 25) comprises a neodymium iron boron material. The rotor magnet 122 may be integrally formed with, or configured for attachment to, a shaft 156, wherein the shaft carries an optical element 158 attached thereto. The optical elements may comprise a mirror, prism, grating disk, aperture wheel, or any other suitable item.

With continued reference to FIG. 25, the shaft 156 may be made of stainless steel, although practically any material can be used so long as the material can withstand the torque and radial loads produced by the motor 200 and any external load connected to the motor within the environment being operated. As above described, the shaft 156 may be integrally formed with the rotor magnet 122 or may be attached to the magnet using adhesives such as epoxy.

The rotor magnet 122 is a single cylindrical magnet material that is diametral magnetized. The rotor 106 may also be made from two or more magnets, so long as the combination of magnets provides a north pole diametrically opposed from a south pole. Thus, other suitable magnets are considered to be within the scope of the present disclosure.

By using a cylindrical rotor magnet 122 that is diametral magnetized, a sinusoidal flux-versus-angle profile results from the magnet. This, in turn, produces an approximately sinusoidal back-EMF profile and correspondingly sinusoidal output-torque versus angle profile for each coil. Since the slots (and thus the coils) are arranged orthogonally, a sine/cosine relationship results.

Note that the rotor magnet 122 may be made from any magnet material. However, highest performance is currently achieved by using neodymium iron boron N48H or better for the rotor magnet.

With continued reference to FIGS. 10 and 11, the rotor 106 sits in an aperture 204 defined by the stator 202. In one embodiment, the stator 202 has high magnetic permeability. The aperture 204 also has first 208a, second 208b, third 208c, and fourth 208d wide slots having very low magnetic permeability. However, as long as the stator 202 does not experience magnetic saturation, cogging (sometimes referred to as "reluctance torques") should be nominal, thanks to the presence of the four narrow slots 209a, 209b, 209c, 209d. Also note that cogging that does exist tends to orient the north-south magnet poles toward the teeth and away from the slots.

To understand the benefits provided by embodiments of the present disclosure, the following are specifications of motors built in accordance with the embodiment depicted in FIG. 10. Such motors were built with a stator 202 having an outside diameter of 10.7 mm (0.420 inches), and having an inside diameter of the aperture of 0.136 inches, with the width dimension w202 of each wide slot being 0.048 inches wide and a depth dimension d201 of 0.071 inches, and the width dimension w205 of each narrow slot being 0.026 inches wide and a depth dimension d204 of each narrow slot of 0.071 inches. The stator 202 was made from a stack of 0.014-inch-thick laminations made of M19 silicon steel having the shape shown in FIG. 10 and the laminations stacked to a collective height of 27.4 mm (1.08 inches).

The exemplary rotor magnet 122 was made with high-grade Neodymium Iron Boron magnet material, having a diameter of 0.12 inches and length of 1.3 inches, attached to stainless steel shafts as described above, corresponding to a rotor inertia of 0.028 GM*CM$^2$.

The coils used for wide slots were wound with 10 turns of AWG #30 wire, and the coils used for narrow slots were wound with 5 turns of AWG #30 wire. All coils were wound as shown in FIG. 14 of U.S. Pat. No. 9,530,559, the entirety of which is incorporated by reference. Thickness of each coil was 0.022 inches, providing an axial length of 0.088 inches dedicated to the end-turns on each end of the motor.

All of coils were inserted into slots as described above and illustrated in FIGS. 13-16, with the four coils of each phase connected in series. With this coil configuration, the peak torque constant (KT) from each of the sine and cosine phase windings was 30,000 D*CM per amp, inductance was 52 microhenry, and coil resistance was 1.2 ohms.

Cogging torque is lower than the four-slot configuration described above, and was found to be acceptably low for optical scanning applications.

The Motor Constant for this embodiment is 27,386 D*CM at 1 watt, which is superior to the 4-slot embodiment described above.

When the motor was filled with a high quality thermally-conductive epoxy, thermal resistance was less than 1 degree C. per watt, resulting in a continuous RMS current capability of 4 amps.

As was described above, designers of brushless motors of the current state of the art may have overlooked the eight-slot stator construction presented above, having four deep/wide slots and four deep/narrow slots, on the basis of trying to minimize "stator harmonics". Although still not sinusoidal as textbook motor designers would endeavor toward, the eight-slot arrangement of the present invention is a marked improvement over the four-slot arrangement, and stator harmonics are reduced. Thus, the 8-slot embodiment provides a smoother-running motor having higher performance, at the cost of additional coils and slightly increased axial length for the end-turns.

Use of "Slot Guards" and Enhanced Thermal Performance

To enhance the electrical insulation afforded by the varnish on the magnet wire, the stator material, or steel, may include electrically-insulating coatings. Used alternatively or in conjunction with the electrically insulating coatings, electrically-insulating liners called "slot guards" 220 may reside at the axially-top and bottom surfaces of the stator 202. These slot guards 220 may be made of electrically insulating material, and have slots 248a-d, 249a-d that are similar in size and orientation to the slots 208a-d, 209a-d in the stator 202. However, the slots 248a-d, 249a-d in the slot guards 220 are made smaller such that the electrical coils 228, 230 can fit through the slot guard slots 248a-d, 249a-d, but are that the coils 228, 230 are firmly held in a position away from the stator 202 slot walls. Using slot guards 220 in this way allows very nearly all of the space within a slot to be filled with turns of copper coil windings, thus maximizing torque production, as opposed to conventional slotted motor construction, which typically uses paper "slot liners". Moreover, the very small space between the coil windings and the edges (walls) of the slot helps to remove heat from the coils.

Slot guards 220 may be made from anything that provides electrical insulation, such as plastic, fibreglass, and phenolic. Although it is desirable that the slot guard material provide electrical insulation, performance of the motor is maximized when the material is also a good conductor of heat. For example, if the slot guards 220 are made from anodized aluminium, the anodized plating provides an electrical insulator while the aluminium provides a very good conductor of heat.

To further improve the thermal performance of the brushless motor, the areas in between the stator slots 208a-d, 209a-d and coils 228, 230 can be filled with thermally-conductive epoxy.

The very high copper packing density of the coils, coupled with the very small space between coils and slots, coupled with the fact that the space between the coils and slots is filled with thermally-conductive epoxy maximizes the overall performance of the motor. This is especially true when the slots themselves do not have any electrical insulating coatings which may impede thermal transfer between the coil windings and the slot.

Coil End-Turns

In manufacturing a small, low-inertia, high-performance motor, the real challenge lies in creating the motor coil windings, inserting those coil windings into the stator, and then forming the end-turns of the coil windings in an effort to keep them to a reasonable axial length.

End-turns are the portions of the coil that exist at the far axial ends of the motor. End-turns do not contribute to torque production, but do contribute to weight, resistance, inductance and heat. As the axial length of end-turns increases, this demands that the overall motor axial length be increased, as well as the total length of the rotor. Additional rotor length undesirably adds inertia and lowers the stiffness of the rotor. Therefore it is clear that, for a high-performance motor, the length of the end-turns should be kept to a minimum.

In that regard it can be shown that for the 4-slot embodiments depicted in FIG. 4 with end-turns folded as shown in FIGS. 9a and 9b, the axial length on each end of the motor consumed by the end-turns is approximately equivalent to twice the thickness of a single coil.

For the 8-slot embodiment depicted in FIG. 10 with end-turns folded as shown in FIGS. 13-16, the axial length on each end of the motor consumed by end-turns is approximately equivalent to four times the thickness of a single coil.

For the 8-slot embodiment depicted in FIG. 10 with end-turns folded as shown in FIGS. 17-21, the axial length on each end of the motor consumed by the end-turns is approximately equivalent to three times the thickness of a single coil.

It is believed that there are no prior-art slotted motors made for continuous rotation that have such a small axial space consumed by end-turns.

Assembly Method Compared to Prior-Art Slotted Motors

While manufacturing prior-art slotted motors, paper "slot liners" are typically placed into the slots before the turns of wire are inserted. As an alternative or corollary treatment, the stator may be "powder coated" with a paint-like substance. The purpose of the paper slot liners or powder coating is to provide electrical insulation such that the coil windings do not come in contact with the stator steel. While the paper slot liners and powder coating do serve that electrical insulating function, they also unfortunately take up valuable space within the slot—space which could be occupied by coil windings if these insulating treatments were not present. The reduction in slot area means either that not as many turns of wire could be placed into the slots, or that smaller-diameter wire must be used. Moreover, in addition to the electrical insulation provided by the paper liners and powder coating, these also provide thermal insulation—effectively preventing heat that is generated by the coil from being conducted away. Thus, the use of paper liners and powder coating serve to limit the maximum continuous current handling capacity of the motor.

In continuing the description of typical prior-art slotted motor manufacturing procedure: After the paper liners are placed into the slots and/or powder coating applied, individual strands of wire are typically wound and formed outside the motor, and then inserted into the slots, often using what is called a "shed winding" technique. The disorganization of such loose wires in the slots ultimately limits the amount of wire that could be placed into the slot. Both the use of paper liners or powder coating plus the disorganized loose turns of wire ultimately limit the performance of the motor.

In prior-art motors, after the loose wires are inserted into the slots, the end-turns must be bent and formed in such a way that they do not occlude the aperture. Moreover, to keep the end-turns in place, it is common to put a string-like material around them. This is called "forming and lacing" the end-turns. All of these manufacturing steps require additional time and materials and, in the end, contribute to additional axial length to the motor due to the end-turns.

For motors with very small inner diameter and/or very long rotor length these prior-art methods of making a slotted motor are impractical.

By contrast, one or more embodiments of the present disclosure utilize coils that are easy to manufacture. The coils are made using bondable magnet wire, and pre-formed externally to the motor. They are easily slid into each motor slot, and may be held away from the stator walls with the aid of slot guards at the axial top and bottom of the motor. End-turns are simply bent over after coil insertion. Because the coils are made using bondable wire, the coils will retain their shape, and so no additional steps are needed to retain the end-turns. Moreover, since each coil is very thin and the end-turns of the separate phases merely overlay on top of one another, the axial length required by the end-turns is minimized.

Rotor Construction Compared to Prior-Art Motors

Prior-art brushless motors that use a magnetic rotor may place arc-shaped magnets on the surface of a steel cylindrical rotor armature. This technique is referred to as "surface permanent magnet" rotor construction, since the magnets are on the surface of the cylindrical armature. Alternatively, the magnets may be encased in laminations in the rotor. This is referred to as "interior permanent magnet" rotor construction. For such prior-art brushless motors, it is known that overall performance of a brushless permanent-magnet motor may be increased by increasing the number of magnetic poles on the rotor—for example, increasing the pole count from two to four or from four to six. But for very small motors having rotor diameter of around 0.3 inches or less, this is not practical. For one thing, cutting the rotor magnet into four or six pieces is difficult with small-diameter magnets. Due to the small rotor diameter of high-performance motors and galvanometers, this prior-art rotor construction technique is not practical. Instead, one or more embodiments of the present disclosure employ a single cylindrical magnet that is diametral magnetized. Shafts may be spindled onto the magnet to form an overall rotor. This simplifies rotor construction and also maximizes the two-pole magnetic field.

Slot Geometry Compared to Prior-Art Motors

One or more embodiments of the present disclosure provide a continuous rotation motor having high acceleration capability as well as high continuous operational current. Moreover, the disclosed embodiments provide slot dimensions differing in size as compared to those of prior-art devices. For example, a consideration of a ratio of slot depth $d_1$ to aperture diameter $a_1$ in an embodiment presented above as defined herein comprises a slot depth of 0.070 inches and a stator aperture of 0.136 inches. These dimensions yield a ratio of $0.070/0.136=0.514$. For comparison with prior-art motors made in a conventional manner and having conventional dimensions, the highest ratio the inventor was able to find was a lamination made by Reuland® having model 4143Z, which has a slot depth of 1.55 inches and aperture diameter of 6 inches, yielding a ratio of only 0.258. Regarding slot width, an exemplary embodiment of the present embodiment presented above and defined herein comprises a wide slot width $w_2$ of 0.048 inches, resulting in a width-to-aperture ratio of $0.048/0.136=0.352$. Prior-art motors made in a conventional manner have slot-width-to-aperture ratios that are a tiny fraction of this. For example, the Reuland® lamination model 4143Z mentioned above has a slot width of 0.19 inches and an aperture diameter of 6 inches, yielding a ratio of only 0.032.

Thus, one or more embodiments of the present disclosure employ slots that are relatively wider and deeper than conventional motors found in the present state of the art. Of course the slot depth to aperture ratio and slot width to aperture ratios presented here are for a single embodiment that has been manufactured, and should not be construed as a limitation. It is believed that this invention can provide benefits beyond prior-art motors with slot depth to aperture ratio of 0.3 or greater and slot width to aperture ratio of 0.3 or greater.

Embodiments of the present disclosure provide a small, continuous-rotation motor capable of the high accelerations and high continuous performance that galvanometer scanners provide.

A continuous rotation motor that utilizes a 2-pole rotor, and stator having 4 deep/wide orthogonal slots is not believed to exist in the prior art. Likewise, a continuous rotation motor that utilizes 2-pole rotor and stator having 8 deep slots, wherein four of the slots are wide and four are narrow is also not believed to exist in the prior art. Moreover, the utilization of thin, pre-formed coils, slid into diametrically opposed slot pairs with end-turns folded over and having sufficient length to not occlude remaining slots is a technique that is not believed to exist in the prior art.

Using the techniques disclosed herein, performance is not only improved over prior art devices, but the embodiments are also easier to assemble than those found in the prior art. The stator laminations are produced using well-known, conventional, and low-cost manufacturing methods. The coils are made with conventional round bondable magnet wire using the techniques described in the '559 patent, or alternatively with rectangular wire using a conventional inside-to-outside spiral winding method. The coils are inserted and folded over in a manner that is easy to accomplish. The entire motor can be built by hand if desired, eliminating any need to employ complex assembly machines or fixtures. The embodiments disclosed not only accomplish things that no other motor has done up until now, but they accomplish them in a way that only requires low cost and commonplace manufacturing methods.

Although a detailed description and drawings of the invention has been provided above, it is to be understood that the scope of the invention is not to be limited thereby. Further, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

What is claimed is:

1. A brushless motor comprising:
a stator defining an aperture extending axially therein and consisting of eight slots, wherein the eight slots consist of four wide slots and four narrow slots, and wherein the four wide slots are arranged as first and second pairs of diametrically opposing wide slots, the first pair generally aligned orthogonally to the second pair, and wherein each of the four narrow slots are positioned between two wide slots.

2. The brushless motor of claim 1, wherein a depth dimension of each of the wide slots is greater than or equal to a depth dimension of each of the narrow slots.

3. The brushless motor of claim 1, wherein a depth dimension of at least one slot of one of the slot pairs is greater than a depth dimension of at least one slot of the other slot pair.

4. The brushless motor of claim 1, wherein a depth dimension of at least one of the narrow slots is greater than or equal to a depth dimension of at least one of the wide slots.

5. The brushless motor of claim 1, wherein a width dimension of at least one of the wide slots is about double a width dimension of at least one of the narrow slots.

6. The brushless motor of claim 1, wherein an angle between a wide slot and a narrow slot is greater than or equal to about 45 degrees.

7. The brushless motor of claim 1, wherein an angle between a wide slot and a narrow slot is less than or equal to about 45 degrees.

8. The brushless motor of claim 1, wherein an angle between a wide slot and a narrow slot is about 68 degrees.

9. The brushless motor of claim 1, wherein an angle between a wide slot and narrow slot is about 22 degrees.

10. The brushless motor of claim 1, further comprising a rotor having a two pole diametral magnetized magnet bidirectionally operable within the aperture, wherein a separation is formed between the magnet and the stator.

11. The brushless motor of claim 10, further comprising a first electrical coil positioned within at least one of the slots, wherein exciting the first electrical coil produces a first torque over a first range of angles.

12. The brushless motor of claim 11, further comprising a second electrical coil positioned within at least one of the slots, wherein exciting the second electrical coil produces a second torque over a second range of angles.

13. The brushless motor of claim 1, wherein the stator comprises magnetically-conductive stacked laminations.

14. The brushless motor of claim 1, wherein a distance between an outer peripheral surface of the stator and the slots is greater than or equal to the depth of the slot.

15. The brushless motor of claim 1, wherein the stator comprises contoured protrusions between the slots, the contoured protrusions defining a uniform gap between the stator and the rotor.

16. The brushless motor of claim 1, wherein the stator comprises contoured protrusions between the slots, the contoured protrusions defining a non-uniform gap between the stator and the rotor.

17. The brushless motor of claim 1, wherein a ratio of slot depth to aperture diameter is about 0.3 or greater.

18. The brushless motor of claim 1, wherein a ratio of wide slot width to aperture diameter is about 0.3 or greater.

19. The brushless motor of claim 1, further comprising a first electrical coil within the first pair of wide slots, wherein the first electrical coil is excitable for providing bidirectional torque to the rotor over a first limited range of angles.

20. The brushless motor of claim 19, further comprising a second electrical coil within the second pair of wide slots, wherein the second electrical coil is excitable for providing bidirectional torque to the rotor over a second limited range of angles that are orthogonal to the first limited range of angles provided by the first electrical coil.

21. The brushless motor of claim 19, further comprising an electrical coil within at least one of the narrow slots.

22. The brushless motor of claim 1, wherein at least one of the first and second pairs of wide slots are devoid of electrical coils.

23. The brushless motor of claim 22, further comprising an electrical coil within at least one of the narrow slots.

24. The brushless motor of claim 1, further comprising a slot guard defining at least one slot generally aligned with at least one of the wide and narrow slots.

25. The brushless motor of claim 24, wherein the slot guard resides in a plane that is parallel to a plane of the stator.

26. The brushless motor of claim 24, wherein the at least one slot guard comprises electrically-insulating material.

27. The brushless motor of claim 24, wherein at least one slot of the slot guard has a width dimension that is less than a width dimension of a corresponding stator slot.

28. The brushless motor of claim 24, wherein the slot guard has fewer slots than the stator.

29. A stator defining an aperture and a series of slots formed therein for use in a brushless motor, the series of slots consisting of:
a first pair of diametrically opposing wide slots;

a second pair of diametrically opposing wide slots, the second pair of wide slots generally aligned orthogonally to the first pair of wide slots; and four narrow slots, wherein each narrow slot is positioned between two wide slots.

30. The stator of claim 29, wherein the stator material defines a contoured end between each slot.

31. The stator of claim 29, wherein a distance between an outer peripheral surface of the stator and at least one slot is at least as great as a depth dimension of a slot.

32. The stator of claim 29, wherein the slots each define a non-uniform curvature of stator material.

33. The stator of claim 29, wherein an angle between a wide slot and a narrow slot is greater than or equal to about 45 degrees.

34. The stator of claim 29, wherein an angle between a wide slot and a narrow slot is less than or equal to about 45 degrees.

35. The stator of claim 29, wherein an angle between a wide slot and a narrow slot is about 68 degrees.

36. The stator of claim 29, wherein an angle between a wide slot and a narrow slot is about 22 degrees.

37. A slot guard for use with a brushless motor, the slot guard comprising:

a planar electrically-insulating material defining an aperture extending axially therein and a series of slots, the series of slots consisting of a pair of opposing wide slots and two pairs of narrow slots.

\* \* \* \* \*